United States Patent
Mayumi et al.

(10) Patent No.: US 9,477,384 B2
(45) Date of Patent: Oct. 25, 2016

(54) DISPLAY CONTROL APPARATUS, SYSTEM AND RECORDING MEDIUM HAVING DISPLAY CONTROL PROGRAM

(71) Applicant: FUJITSU LIMITED, Kawasaki-shi, Kanagawa (JP)

(72) Inventors: Hidehiko Mayumi, Kawasaki (JP); Toshio Tanaka, Yokohama (JP); Takeaki Kobayashi, Yokohama (JP); Masahiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 166 days.

(21) Appl. No.: 14/257,045

(22) Filed: Apr. 21, 2014

(65) Prior Publication Data

US 2014/0340408 A1 Nov. 20, 2014

(30) Foreign Application Priority Data

May 14, 2013 (JP) ................ 2013-102590

(51) Int. Cl.
*G06F 3/0484* (2013.01)
*G09B 5/12* (2006.01)
*G09B 7/07* (2006.01)
*G09B 7/02* (2006.01)

(52) U.S. Cl.
CPC ............ *G06F 3/0484* (2013.01); *G09B 5/125* (2013.01); *G09B 7/02* (2013.01); *G09B 7/07* (2013.01)

(58) Field of Classification Search
None
See application file for complete search history.

(56) References Cited

U.S. PATENT DOCUMENTS 5,517,578 A 5/1996 Altman et al.
8,704,792 B1* 4/2014 Kataoka ............ G06F 3/04883
345/173

(Continued)

FOREIGN PATENT DOCUMENTS

JP 2003-131782 5/2003
JP 2005-209187 8/2005

(Continued)

OTHER PUBLICATIONS

Office Action issued by the Korean Intellectual Property Office on Jan. 28, 2016 in corresponding Korean patent application No. 10-2014-0049483.

(Continued)

*Primary Examiner* — Jacinta M Crawford
*Assistant Examiner* — Phuc Doan
(74) *Attorney, Agent, or Firm* — Staas & Halsey LLP

(57) ABSTRACT

A display control apparatus includes a reception unit configured to receive designation of at least one data among a plurality of data when each of the plurality of data is disposed and displayed in each of a plurality of different first areas of a display area by a display apparatus; and a changing unit configured to change a degree of emphasis in each symbol displayed on the display area depending on a positional relationship between the symbol and the data associated with the designation received by the reception unit when the designation is received by the reception unit.

9 Claims, 29 Drawing Sheets

(56) References Cited

U.S. PATENT DOCUMENTS

| | | | |
|---|---|---|---|
| 8,890,827 B1* | 11/2014 | Nordstrom | G06F 3/04883 345/173 |
| 2005/0147950 A1* | 7/2005 | Ortiz | G06Q 10/101 434/238 |
| 2008/0115064 A1* | 5/2008 | Roach | G06F 3/04817 715/730 |
| 2008/0235211 A1* | 9/2008 | Saund | G06F 17/30961 |
| 2011/0078573 A1* | 3/2011 | Ooba | G06F 9/4443 715/733 |
| 2013/0047093 A1* | 2/2013 | Reuschel | G06F 3/04883 715/753 |
| 2013/0198653 A1* | 8/2013 | Tse | G06F 3/0484 715/751 |

FOREIGN PATENT DOCUMENTS

| | | | |
|---|---|---|---|
| JP | 2007-219217 | 8/2007 | |
| JP | 2010-113441 | 5/2010 | |
| JP | 2011-81651 | 4/2011 | |
| KR | 10-2009-0007865 | 1/2009 | |
| KR | 1020100024102 | * 3/2010 | G06F 3/048 |

OTHER PUBLICATIONS

Korean Office Action issued Jul. 22, 2016 in corresponding Korean Patent Application No. 10-2014-0049483.

* cited by examiner

FIG. 3

| STUDENT ID | STUDENT NAME | STUDENT TERMINAL IP ADDRESS |
|---|---|---|
| 1001 | TANAKA | XX.YY.ZZ.A1 |
| 1002 | YAMADA | XX.YY.ZZ.A2 |
| 1003 | SUZUKI | XX.YY.ZZ.A3 |
| 1004 | YAMAMOTO | XX.YY.ZZ.A4 |
| 1005 | KURODA | XX.YY.ZZ.A5 |
| 1006 | HONDA | XX.YY.ZZ.A6 |
| 1007 | SATO | XX.YY.ZZ.A7 |
| 1008 | ASAI | XX.YY.ZZ.A8 |

| ASSIGN-MENT ID | ASSIGNMENT CONTENT | REPLY LIMITATION TIME |
|---|---|---|
| 0001 | HOW DO YOU THINK ABOUT UNDERAGE ABORTION? | 20 Min |
| 0002 | HOW DO YOU THINK ABOUT RECEIVING DEBRIS? | 30 Min |
| 0003 | ... | ... |
| 0004 | ... | ... |

| ASSIGN-MENT ID | | | | | | |
|---|---|---|---|---|---|---|
| 0002 | | | ⋮ | | | |

| STU-DENT ID | APPROV-AL/DISAP-PROVAL | OPINION CONTENT | OPINION DISPLAY AREA COORDINATE AND PREDETERMINED FRAME AREA COORDINATE | | | |
|---|---|---|---|---|---|---|
| | | | UPPER LEFT | LOWER LEFT | UPPER RIGHT | LOWER RIGHT |
| 1001 | APPROV-AL | WE ARE TO HELP SOMEONE IN NEED. | (0,60) (-10,70) | (0,30) (-10,25) | (40,60) (45,70) | (40,30) (45,25) |
| 1002 | APPROV-AL | I THINK WE ARE TO COOPERATE WITH OTHERS FOR THESE THINGS. | (40,60) (35,70) | (40,30) (35,25) | (80,60) (85,70) | (80,30) (85,25) |
| 1003 | APPROV-AL | IF WE ALL HELP TOGETHER, THERE WILL BE NO PROBLEMS. | (80,60) (75,70) | (80,30) (75,25) | (120,60) (125,70) | (120,30) (125,25) |
| 1004 | APPROV-AL | IT MAY BE USED FOR BURIAL. | (120,60) (115,70) | (120,30) (115,25) | (160,60) (170,70) | (160,30) (170,25) |
| 1005 | APPROV-AL | THERE IS NO DIFFERENCE BETWEEN US. DISATER DUE TO EARTHQUAKE MAY OCCUR ANYWHERE. | (0,30) (-10,35) | (0,0) (-10,-10) | (40,30) (45,35) | (40,0) (45,-10) |
| 1006 | DISAP-PROVAL | THERE IS A PROBLEM FOR THE PLACE. THERE WILL NOT BE ANY REMAINING PLACES. | (40,30) (35,35) | (40,0) (35,-10) | (80,30) (85,35) | (80,0) (85,-10) |
| 1007 | APPROV-AL | WE ACCOMMODATE IT. | (80,30) (75,35) | (80,0) (75,-10) | (120,30) (125,35) | (120,0) (125,-10) |
| 1008 | APPROV-AL | THERE IS NO REASON TO REJECT. | (120,30) (115,35) | (120,0) (115,-10) | (160,30) (170,35) | (160,0) (170,-10) |

| MARK ID | START POINT COORD- INATE | END POINT COORD- INATE | PROCEEDED COORDINATES |
|---|---|---|---|
| M1 | (26,61) | (26,61) | (26,61)(26,60)(26,59)...... |
| M2 | (60,12) | (64,20) | (60,12)(59,12)(58,11)...... |
| M3 | (69,48) | (79,47) | (69,48)(70,47)(71,46)...... |
| ... | ... | ... | ... |

|  | EXCESS WIDTH | CORRECTION WIDTH |
|---|---|---|
| X-AXIS (HORIZONTAL) | 5 | +5 |
| Y-AXIS (VERTICAL) | 5 | +5 |

```
                                                                    20
┌─────────────────────────────────────────────────────────────────────┐
│                    ASSIGNMENT SELECTION SCREEN                      │
│  PLEASE SELECT AN ASSIGNMENT INTENDING FOR A STUDENT TO REVIEW AND  │
│                    DEPRESS "TRANSMISSION" BUTTON.                   │
└─────────────────────────────────────────────────────────────────────┘
```

| | SELECTION BUTTON | ASSIGN-MENT ID | ASSIGNMENT CONTENT |
|---|---|---|---|
| 20a | ☐ | 0001 | HOW DO YOU THINK ABOUT UNDERAGE ABORTION? |
| 20a | ☐ | 0002 | HOW DO YOU THINK ABOUT RECEIVING DEBRIS? |
| | ... | ... | ... |

20b: TRANSMISSION    20c: CANCEL

FIG. 13

| | <SELECTION MODE SCREEN> ASSIGNMENT: HOW DO YOU THINK ABOUT RECEIVING DEBRIS? | | | |
|---|---|---|---|---|
| 60 | 22a  22b  22c | | | |
| 32 | APPROVAL/DISAPPROVAL: APPROVAL OPINION: WE ARE TO HELP SOMEONE IN NEED. MR. TANAKA | APPROVAL/DISAPPROVAL: APPROVAL OPINION: I THINK WE ARE TO COOPERATE WITH OTHERS FOR THESE THINGS. MR. YAMADA | APPROVAL/DISAPPROVAL: APPROVAL OPINION: IF WE ALL HELP TOGETHER, THERE WILL BE NO PROBLEMS. MR. SUZUKI | APPROVAL/DISAPPROVAL: APPROVAL OPINION: IT MAY BE USED FOR BURIAL. MR. YAMAMOTO |
| 30 | APPROVAL/DISAPPROVAL: APPROVAL OPINION: THERE IS NO DIFFERENCE BETWEEN US. DISATER DUE TO EARTHQUAKE MAY OCCUR ANYWHERE. MR. KURODA | APPROVAL/DISAPPROVAL: DISAPPROVAL OPINION: THERE IS A PROBLEM FOR THE PLACE. THERE WILL NOT BE ANY REMAINING PLACES. MR. HONDA | APPROVAL/DISAPPROVAL: APPROVAL OPINION: WE ACCOMMODATE IT. MR. SATO | APPROVAL/DISAPPROVAL: APPROVAL OPINION: THERE IS NO REASON TO REJECT. MR. ASAI |
| 0 | 40 | 80 | 120 | 160 |

| 27a | 27b |
|---|---|
| DISPLAY SELECTED OPINION IN AN ENLARGED SCALE | RETURN TO A TABLE DISPLAY |

FIG. 14

ASSIGNMENT: HOW DO YOU THINK ABOUT RECEIVING DEBRIS?

APPROVAL/DISAPPROVAL:
APPROVAL
OPINION: WE ARE TO HELP SOMEONE IN NEED.

MR. TANAKA

RETURN TO A TABLE DISPLAY

FIG. 19

REPLY SCREEN (ASSIGNMENT ID 0001)

HOW DO YOU THINK ABOUT RECEIVING DEBRIS?

PLEASE WRITE APPROVAL/DISAPPROVAL AND OPINION ABOUT ASSIGNMENT AND DEPRESS BUTTON "TRANSMIT TO TEACHER".

60a ☐ APPROVAL   60b ☐ DISAPPROVAL

OPINION COLUMN   60c

[ TRANSMIT TO TEACHER ] 60d          [ CLEAR OPINION ] 60e

FIG. 24

| | <SELECTION MODE SCREEN> ASSIGNMENT: HOW DO YOU THINK ABOUT RECEIVING DEBRIS? | | | |
|---|---|---|---|---|
| 60 | APPROVAL/DISAPPROVAL: APPROVAL OPINION: WE ARE TO HELP SOMEONE IN NEED. MR. TANAKA | APPROVAL/DISAPPROVAL: APPROVAL OPINION: I THINK WE ARE TO COOPERATE WITH OTHERS FOR THESE THINGS. MR. YAMADA | APPROVAL/DISAPPROVAL: APPROVAL OPINION: IF WE ALL HELP TOGETHER, THERE WILL BE NO PROBLEMS. MR. SUZUKI | APPROVAL/DISAPPROVAL: APPROVAL OPINION: IT MAY BE USED FOR BURIAL. MR. YAMAMOTO |
| 30 | APPROVAL/DISAPPROVAL: APPROVAL OPINION: THERE IS NO DIFFERENCE BETWEEN US. DISATER DUE TO EARTHQUAKE MAY OCCUR ANYWHERE. MR. KURODA | APPROVAL/DISAPPROVAL: DISAPPROVAL OPINION: THERE IS A PROBLEM FOR THE PLACE. THERE WILL NOT BE ANY REMAINING PLACES. MR. HONDA | APPROVAL/DISAPPROVAL: APPROVAL OPINION: WE ACCOMMODATE IT. MR. SATO | APPROVAL/DISAPPROVAL: APPROVAL OPINION: THERE IS NO REASON TO REJECT. MR. ASAI |
| 0 | 40 | 80 | 120 | 160 |

| RELEASE SELECTED OPINION | DISPLAY SELECTED OPINION IN AN ENLARGED SCALE | RETURN TO A TABLE DISPLAY |
|---|---|---|

FIG. 25

| ASSIGNMENT: HOW DO YOU THINK ABOUT RECEIVING DEBRIS? ||
|---|---|
| APPROVAL/DISAPPROVAL: APPROVAL<br>OPINION: WE ARE TO HELP SOMEONE IN NEED.<br><br>MR. TANAKA | APPROVAL/DISAPPROVAL: APPROVAL<br>OPINION: I THINK WE ARE TO COOPERATE WITH OTHERS FOR THESE THINGS.<br>MR. YAMADA |
| APPROVAL/DISAPPROVAL: APPROVAL<br>OPINION: THERE IS NO DIFFERENCE BETWEEN US. DISATER DUE TO EARTHQUAKE MAY OCCUR ANYWHERE.<br>MR. KURODA | APPROVAL/DISAPPROVAL: APPROVAL<br>OPINION: THERE IS A PROBLEM FOR THE PLACE. THERE WILL NOT BE ANY REMAINING PLACES.<br>MR. HONDA |

RETURN TO A TABLE DISPLAY

DISPLAY CONTROL APPARATUS, SYSTEM AND RECORDING MEDIUM HAVING DISPLAY CONTROL PROGRAM

CROSS-REFERENCE TO RELATED APPLICATION

This application is based upon and claims the benefit of priority of the prior Japanese Patent Application No. 2013-102590 filed on May 14, 2013, the entire contents of which are incorporated herein by reference.

FIELD

The embodiments discussed herein are related to a display control apparatus, a system and a recording medium having a display control program stored therein.

BACKGROUND

Many classes are being conducted using mobile terminals, such as a slate terminal, in which a handwriting input is performed by a touch pen or finger, and it is anticipated that these types of classes will be more widely distributed.

There is a technology in which an image display apparatus constituted by a display unit and a touch panel displays surrounding images of a plurality of images in an enlarged scale, along with the plurality of images corresponding to the touch panel, when the touch panel corresponding to the plurality of images displayed in the display unit is manipulated.

Further, there is a technology in which an area surrounded by a circular locus of bright spots of a pointer is displayed in an enlarged scale when an indication position of a pointer is moved to be and rotated to the right by a user to surround a portion of a screen-shaped projected image.

There is also a technology in which a projector generates a zoom image in which a portion of an image is highlighted and an area including the highlighted portion is enlarged, and projects the generated zoom image, based on indication information input by a user.

See, for example, Japanese Laid-Open Patent Publication No. 2010-113441, Japanese Laid-Open Patent Publication No. 2011-81651, and Japanese Laid-Open Patent Publication No. 2007-219217.

Following class type may be considered as the class type using the mobile terminal provided with a handwriting input function as described above. For example, an assignment is transmitted from a teacher's terminal to a student's terminal, and an opinion regarding the assignment is input to the student's terminal by the student. The student's terminal then transmits the input opinion to the teacher's terminal. When the opinions transmitted from the students' terminals are integrated by a teacher, the teacher's terminal may display a plurality of integrated opinions in a matrix shape on an electronic blackboard connected to the teacher's terminal. Also, discussions regarding the opinions may be conducted by students while the opinions are being displayed on the electronic blackboard. Also, a line may be drawn by the teacher or a comment input by the teacher in handwriting may be attached on the opinions displayed on the electronic blackboard.

However, it is difficult to view an opinion in the type of class as described above in which a line is drawn or a comment input in handwriting is attached on the opinions displayed on the electronic blackboard, which is problematic. For example, it may be considered that a specific opinion selected by the teacher among a plurality of displayed opinions is intended to be displayed in an enlarged scale in the type of class as described above. In this case, a line or a comment input in handwriting having a low relevancy to the opinion displayed in an enlarged scale may also be equally displayed in an enlarged scale. Therefore, there exists a problem that a line which is not relevant to the opinion displayed in an enlarged scale is included in the opinion in the type of class which uses, for example, the mobile terminal, causing it difficult to view the opinion. Further, such a problem is not limited to a case where the opinion is displayed in an enlarged scale, and may also occur in a case where data other than the opinion is simply displayed as well.

SUMMARY

According to an aspect of the embodiment, a display control apparatus includes a reception unit configured to receive designation of at least one data among a plurality of data when each of the plurality of data is disposed and displayed in each of a plurality of different first areas of a display area by a display apparatus; and a changing unit configured to change a degree of emphasis in each symbol displayed on the display area depending on a positional relationship between the symbol and the data associated with the designation received by the reception unit when the designation is received by the reception unit.

The object and advantages of the disclosure will be realized and attained by means of the elements and combinations particularly pointed out in the claims. It is to be understood that both the foregoing general descriptions and the following detailed descriptions are exemplary and explanatory, and are not restrictive of the invention, as claimed.

BRIEF DESCRIPTION OF DRAWINGS

FIG. 3 is a view illustrating an exemplary data structure of a student DB.

FIG. 4 is a view illustrating an exemplary data structure of an assignment DB.

FIG. 5 is a view illustrating an exemplary data structure of an assignment reply DB.

FIG. 6 is a view illustrating an exemplary data structure of a handwriting-input mark coordinate DB.

FIG. 7 is a view illustrating an exemplary data structure of a predetermined frame determining TBL.

FIG. 8 is a view for explaining an example of an assignment selection screen generation method.

FIG. 13 is a view illustrating an example of a selection mode screen.

FIG. 14 is a view illustrating an example of a screen in a case of displaying an opinion and a mark in an enlarged scale.

FIG. 19 is a view illustrating an exemplary reply screen.

FIG. 24 is a view for explaining a modified example of the embodiment.

FIG. 25 is a view for explaining a modified example of the embodiment.

DESCRIPTION OF EMBODIMENTS

Hereinbelow, exemplary embodiments of a display control apparatus, a system and a display control program disclosed in the present disclosure will be described in detail with reference to the drawings. Further, the embodiments are not intended to limit the disclosed technique.

Embodiment

Example of System Configuration

Figure 1:
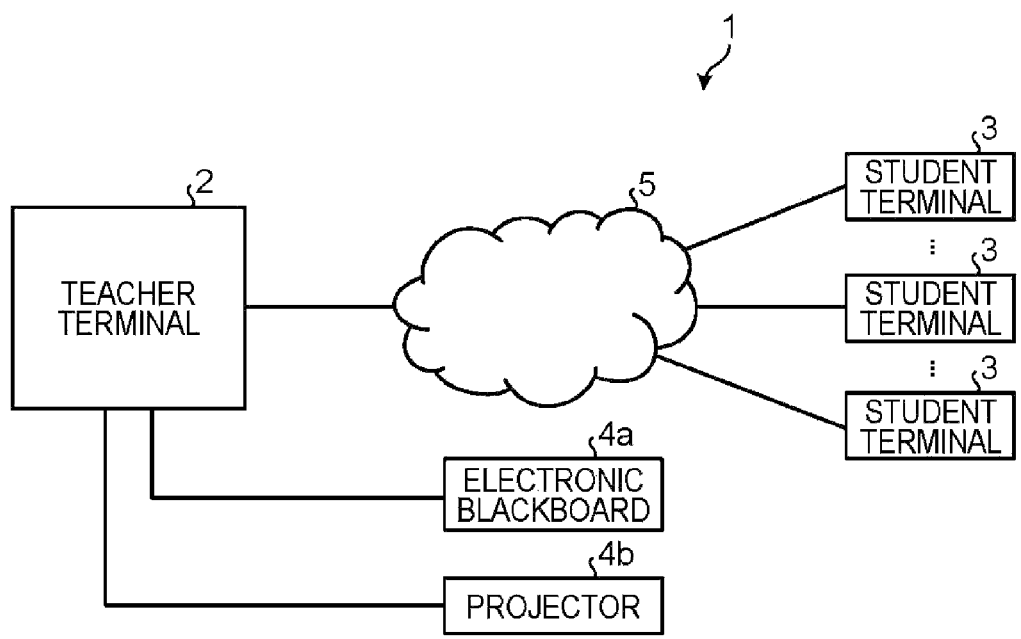
FIG. 1 is a view illustrating an exemplary configuration of a system according to an embodiment of the present disclosure.

Descriptions will be made on a system according to an exemplary embodiment. FIG. 1 is a view illustrating an exemplary configuration of the system according to the embodiment. As illustrated in FIG. 1, the system 1 includes a teacher terminal 2, a plurality of student terminals 3, an electronic blackboard 4a and a projector 4b. The teacher terminal 2 and the plurality of student terminals 3 are connected with each other through, for example, a network 5. Accordingly, the teacher terminal 2 and the plurality of student terminals 3 may be communicated with each other. The network 5 may include any communication network such as the Internet, a LAN (Local Area Network) or a VPN (Virtual Local Network), irrespective of wired or wireless communication network.

The electronic blackboard 4a displays an image output from the projector 4b. The projector 4b controls the electronic blackboard 4a to display a predetermined image.

In the system 1 according to the embodiment, the teacher terminal 2 which is a terminal used by a teacher who conducts a class is manipulated to transmit an assignment to each of the plurality of student terminals 3 that correspond to the plurality of terminals used by each of a plurality of students who attend in the class conducted by the teacher. Then, the system 1 may be prompted such that the teacher terminal 2 transmits the assignment to the student terminal 3. Also, when an opinion about the assignment is input by the student, the student terminal 3 transmits the opinion input by the student to the teacher terminal 2 in the system 1. In the system 1, the teacher terminal 2 transmits opinions integrated by the teacher to the projector 4b or the student terminal 3 to display the opinions on the electronic blackboard 4a or the student terminal 3 in a matrix shape. By doing this, the teacher may conduct a class in which the students are requested to conduct discussions about the opinions while displaying the opinions on the electronic blackboard 4a or the student terminal 3.

Figure 2:
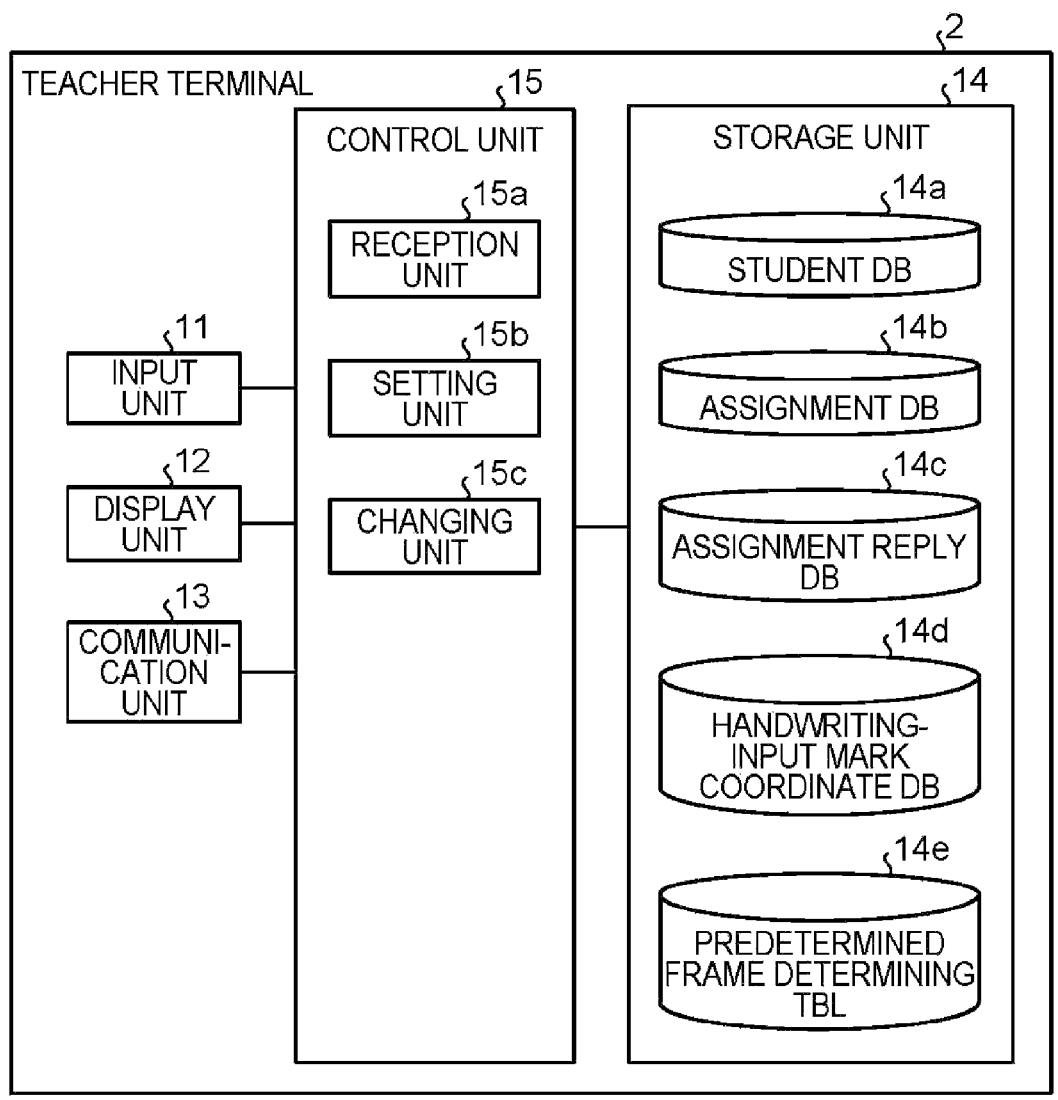
FIG. 2 is a view illustrating an exemplary functional configuration of a teacher terminal.

The teacher terminal 2 may be one of a variety of terminals including, for example, a mobile terminal such as a slate terminal. The teacher terminal 2 is an example of a display control apparatus. FIG. 2 is a view illustrating an exemplary functional configuration of the teacher terminal. As illustrated in the example of FIG. 2, the teacher terminal 2 includes an input unit 11, a display unit 12, a communication unit 13, a storage unit 14 and a control unit 15.

The input unit 11 inputs various information to the control unit 15. For example, the input unit 11 is a touch panel provided on the display unit 12, and receives a manipulation of a touch pen used by the teacher who conducts the class and inputs the received manipulation to the control unit 15. An example of such manipulation of the touch pen may include a manipulation, for example, for drawing a mark or executing a displaying process to be described below.

The display unit 12 displays various information. For example, the display unit 12 displays an assignment selection screen to be described below by the control of the reception unit 15a to be described below. An example of the display unit 12 may include, for example, a liquid crystal display.

The communication unit 13 is a communication interface that allows the teacher terminal 2, the student terminal 3, the electronic blackboard 4a and the projector 4b to communicate with each other.

The storage unit 14 stores various information. For example, the storage unit 14 stores a student database 14a, an assignment database 14b, an assignment reply database 14c, a handwriting-input mark coordinate DB 14d and a predetermined frame determining table 14e. Hereinbelow, a database and a table are abbreviated to "DB" and "TBL", respectively.

Various information of students who attend in a class are registered in the student DB 14a. FIG. 3 is a view illustrating an exemplary data structure of a student DB. As illustrated in the example of FIG. 3, the student DB 14a includes fields for a "student ID", a "student name" and a "student terminal IP (Internet Protocol) address". An ID for identifying a student is registered in the "student ID" field in advance. A family name of a student identified by the ID registered in the "student ID" field is registered in the "student name" field in advance. An IP address of the student terminal 3 used by the student identified by the ID registered in the "student ID" field is registered in the "student terminal IP address" field.

For example, a first record of the student DB 14a illustrated in the example of FIG. 3 indicates that the family name identified by the ID "1001" is "Tanaka" and the IP address of the student terminal 3 used by the student "Tanaka" is "XX.YY.ZZ.A1". The same rule applies with other records of the student DB 14a.

Referring back to the description of FIG. 2, information on an assignment presented by a teacher to a student is registered in the assignment DB 14b. FIG. 4 is a view illustrating an exemplary data structure of an assignment DB. As illustrated in an example of FIG. 4, an assignment DB 14b includes fields for an "assignment ID", an "assignment content" and a "reply limitation time". An ID for identifying an assignment is registered in the "assignment ID" field in advance. The content of assignment identified by the ID registered in the "assignment ID" field are registered in the "assignment content" field in advance. The limitation time indicating a time until a reply is received from a student after an assignment identified by the ID registered in the "assignment ID" field is presented to the student is registered in the "reply limitation time" field in advance. The student is required to transmit a reply to the teacher terminal 2 within the reply limitation time.

For example, a first record of the assignment DB 14b illustrated in the example of FIG. 4 indicates that the content of assignment identified by the ID "0001" is "How do you think about underage abortion?". Additionally, the first record of the assignment DB 14b illustrated in the example of FIG. 4 indicates that a limitation time until a reply is received from a student after an assignment identified by the ID "0001" is presented to the student is "20 minutes". The same rule applies with other records.

Referring back to the description of FIG. 2, the assignment reply DB 14c includes a table in which various information on the reply of students about an assignment for each assignment are registered. FIG. 5 is a view illustrating an exemplary data structure of an assignment reply DB. As illustrated in an example of FIG. 5, the assignment reply DB 14c includes a table 14c_1 in which the reply of students about the assignment for each assignment are registered. The table 14c_1 includes fields for an "assignment ID", a "student ID", an "approval or disapproval", an "opinion content", and an "opinion display area coordinate and predetermined frame area coordinate". An ID for identifying an assignment is registered in the "assignment ID" field by the reception unit 15a to be described below. An ID of a student who replies an opinion about the assignment identified by the ID registered in the "assignment ID" field is registered in the "student ID" field by the reception unit 15a. The content of approval or disapproval replied by the student identified by the ID registered in the "student ID" field is registered in an "approval or disapproval" field by the reception unit 15a, as an approval or disapproval about the assignment identified by the ID registered in the "assignment ID" field. The content of opinion replied by the student identified by the ID registered in the "student ID" field is registered in the "opinion content" field by the reception unit 15a, as an opinion content about the assignment identified by the ID registered in the "assignment ID" field.

The "opinion display area coordinate and predetermined frame area coordinate" field includes respective fields for the "upper left", "lower left", "upper right", and "lower right". In a case where a plurality of opinions are displayed in a matrix shape to be described below, the coordinate of an upper left position of an area in which the opinion of the student identified by the ID registered in the "student ID" field is displayed is registered in the top portion of the "upper left" field by the reception unit 15a. Additionally, a coordinate of an upper left position of a predetermined frame area to be described below, which is used when the opinion displayed in the area of which the coordinate of the upper left position is registered in the top portion is designated (selected) by the teacher and the designated opinion is displayed in an enlarged scale, is registered in the bottom portion of the "upper left" field by the reception unit 15a. That is, the coordinate of the upper left position of the predetermined frame area, which is used for a case of determining as to whether the mark drawn by the teacher on the display unit 12 is to be displayed in an enlarged scale when the designated opinion is displayed in an enlarged scale, is registered in the bottom portion of the "upper left" field by the reception unit 15a. Further, the coordinate registered in the bottom portion of the "upper left" field is updated by the setting unit 15b to be described below. Here, the mark is also referred to as a symbol. The mark may have various shapes such as a character, a sign, or a figure.

In a case where a plurality of opinions are displayed in a matrix shape, a coordinate of a lower left position of the area in which the opinion of the student identified by the ID registered in the "student ID" field is displayed is registered in the top portion of the "lower left" field by the reception unit 15a. Additionally, a coordinate of a lower left position of the predetermined frame area is registered in the bottom portion of the "lower left" field by the reception unit 15a. Further, the coordinate registered in the bottom portion of the "lower left" field is updated by the setting unit 15b.

In a case where a plurality of opinions are displayed in a matrix shape, a coordinate of an upper right position of the area in which the opinion of the student identified by the ID registered in the "student ID" field is displayed is registered in the top portion of the "upper right" field by the reception unit 15a. Additionally, a coordinate of an upper right position of the predetermined frame area is registered in the bottom portion of the "upper right" field by the reception unit 15a. Further, the coordinate registered in the bottom portion of the "upper right" field is updated by the setting unit 15b.

In a case where a plurality of opinions are displayed in a matrix shape, a coordinate of a lower right position of the area in which the opinion of the student identified by the ID registered in the "student ID" field is displayed is registered in the top portion of the "lower right" field by the reception unit 15a. Additionally, a coordinate of a lower right position of the predetermined frame area is registered in the bottom portion of the "lower right" field by the reception unit 15a. Further, the coordinate registered in the bottom portion of the "lower right" field is updated by the setting unit 15b.

For example, the table 14c_1 illustrated in an example of FIG. 5 indicates a table in which the reply of the student about the assignment about "How do you think receiving debris from a disaster area?" identified by the assignment ID "0002" is registered. Further, a first record of the table 14c_1 illustrated in the example of FIG. 5 indicates that the student identified by the student ID "0001" has an opinion of "approval" about "receiving debris" regarding the assignment of "How do you think receiving debris from a disaster area?". Further, the first record of the table 14c_1 indicates that the same student replies the content of opinion as "We are to help others in need." Furthermore, the first record of the table 14c_1 indicates that the coordinate of the upper left position is (0, 60), the coordinate of the lower left position is (0, 30), the coordinate of the upper right position is (40, 60), and the coordinate of the lower right position is (40, 30) of an area in which the opinion replied by the same student is displayed. Further, the first record of the table 14c_1 indicates that coordinates of positions of four corners of a predetermined frame area, which is used when the opinion replied by the same student is selected and the selected opinion is displayed in an enlarged scale, are as the following coordinates. That is, the first record of the table 14c_1 indicates that the coordinate of the left upper position is (−10, 70), the coordinate of the lower left position is (−10, 25), the coordinate of the upper right position is (45, 70), and the coordinate of the lower right position is (45, 25) of the predetermined frame area. The same rule applies with other records of the table 14c_1. Further, in the present embodiment, 1 cm is set as a single unit of the coordinate system for easy understanding.

Referring back to the description of FIG. 2, the touch pen is manipulated by the teacher on the input unit 11 and thus, various information of a mark drawn on the display unit 12 are registered in the handwriting-input mark coordinate DB 14d. FIG. 6 is a view illustrating an exemplary data structure of the handwriting-input mark coordinate DB. As illustrated in an example of FIG. 6, the handwriting-input mark coordinate DB 14d includes fields for a "mark ID", a "start point coordinate", an "end point coordinate" and a "progressed coordinate".

An ID for identifying a mark is registered in the "mark ID" field by the reception unit 15a. A start point coordinate of the mark identified by the ID registered in the "mark ID" field is registered in the "start point coordinate" field by the reception unit 15a to be described below. An end point coordinate of the mark identified by the ID registered in the "mark ID" field is registered in the "end point coordinate" field by the reception unit 15a. The coordinates of points between the start point coordinate and the end point coordinate of the mark identified by the ID registered in the "mark ID" field are registered in the "progressed coordinate" field by the reception unit 15a.

For example, a first record of the handwriting-input mark coordinate DB 14d illustrated in the example of FIG. 6 indicates that a coordinate of a start point of a mark identified by the ID "M1" is (26, 61) and a coordinate of an end point of the mark identified by the ID "M1" is (26, 61). Further, the first record of the handwriting-input mark coordinate DB 14d illustrated in the example of FIG. 6 indicates that the coordinates of points between the start point coordinate and the end point coordinate of the mark identified by the ID registered in the in the "M1" are (26,61), (26,60), (26,59) . . . . The same rule applies with other records.

An excess width of a predetermined frame to be describe below is registered in the predetermined frame determining TBL 14e by a setting unit 15b to be describe below. FIG. 7 is a view illustrating an exemplary data structure of a predetermined frame determining table. The predetermined frame determining TBL 14e illustrated in an example of FIG. 7 includes both an "excess width" field and a "correction width" field in each of X-axis direction and Y-axis direction. An excess width in the corresponding direction to be described below is registered in the "excess width" field by the setting unit 15b. A correction width in the corresponding direction to be described below is registered in the "correction width" field in advance. A record associated with the X-axis direction of the predetermined frame determining TBL 14e illustrated in the example of FIG. 7 indicates that the excess width and the correction width in the X-axis direction are "5" (cm) and "+5" (cm), respectively. Further, the record associated with the Y-axis direction of the predetermined frame determining TBL 14e illustrated in the example of FIG. 7 indicates that the excess width and the correction width in the Y-axis direction are "5" (cm) and "+5" (cm), respectively.

Here, a method for using a predetermined frame will be described. For example, the predetermined frame is determined for each area in which an opinion is displayed in the present embodiment. In the present embodiment, when the opinion designated (selected) by the teacher is displayed in an enlarged scale, a mark that all of the coordinates including coordinates of the start point and the end point and the progressed coordinates of the mark are included in an the predetermined frame area determined for the area in which the designated opinion is displayed, is also displayed in an enlarged scale similarly to the opinion. That is, such a mark is highlighted. Further, in the present embodiment, when the opinion designated by the teacher is displayed in an enlarged scale, the following process is performed on a mark in which any of the coordinate of the start point, the coordinate of the end point and the progressed coordinates is not included in the predetermined frame area determined for the area in which the designated opinion is displayed. That is, when the designated opinion is displayed in an enlarged scale, such a mark is not displayed or changed such that a line width of the mark becomes narrower, a line of the mark is changed into a broken line or a line density of the mark becomes thinner. By doing this, when the opinion designated by the teacher is displayed in an enlarged scale, the mark in which any of the coordinate of the start point, the coordinate of the end point and the progressed coordinates is not included in the predetermined frame area is changed such that a degree of emphasis in the mark becomes lower.

The storage unit 14 may be, for example, a semiconductor memory device such as a flash memory, or a hard disk or an optical disk. Also, the storage unit 14 may include, but is not limited to, RAM (Random Access Memory) or ROM (Read Only Memory).

The control unit 15 includes an internal memory for storing a program in which various processing sequences are defined or a control data, and executes various processes by the program and the control data. As illustrated in FIG. 2, the control unit 15 includes a reception unit 15a, a setting unit 15b and a changing unit 15c.

The reception unit 15a receives various information. One aspect of the reception unit 15a will be described. For example, when an instruction to execute a display control process is input from the input unit 11 due to the manipulation of the touch pen by the teacher, the reception unit 15a generates an assignment selection screen and controls the display unit 12 to display the assignment selection screen.

An example of an assignment selection screen generation method by the reception unit 15a will be described. FIG. 8 is a view explaining an example of an assignment selection screen generation method. When generating an assignment selection screen, the reception unit 15a first acquires all of the IDs and the contents of the assignments registered in the assignment DB 14b. The reception unit 15a, as illustrated in an example of FIG. 8, registers the acquired IDs and the contents of the assignments in the "assignment ID" field and the "assignment content" of the assignment selection screen 20, respectively, by associating the ID of the assignments with the contents of the assignments. Further, as illustrated in the example of FIG. 8, the reception unit 15a forms a check box 20a in a "selection button" field of the assignment selection screen 20 by associating the check box 20a with the "assignment ID" field and the "assignment content" field. The check box 20a is checked by the manipulation of the input unit 11 by the teacher using the touch pen. For example, when the check box 20a associated with a second record of the assignment selection screen 20 illustrated in the example of FIG. 8 is checked, the checked check box 20a indicates the following matters. That is, the check box 20a indicates that an assignment of which content is "How do you think about receiving debris from a disaster area?" is selected as the assignment identified by the ID "0002". Further, as illustrated in an example of FIG. 8, the reception unit 15a forms a button 20b for acquiring the ID and the content of the assignment associated with the checked check box in the assignment selection screen 20. Further, the reception unit 15a forms a button 20c for closing the assignment selection screen 20 in the assignment selection screen 20. Further, the reception unit 15a, as illustrated in the example of FIG. 8, forms a message, which is used for prompting the teacher to select the assignment, of "Please select an assignment intending for a student to review and depress "Transmission button." in the assignment selection screen 20. The reception unit 15a generates the assignment selection screen 20 according to the method described above. Also, the reception unit 15a controls the display unit 12 to display the assignment selection screen 20. By doing this, the display unit 12 displays the assignment selection screen 20.

The reception unit 15a determines whether the ID and the content of the assignment associated with the checked check box 20a are received after controlling the display unit 12 to display the assignment selection screen 20. For example, the reception unit 15a determines whether the ID and the content of the assignment associated with the checked check box 20a are acquired as a result of the depression of the button 20b to determine whether the ID and the content of the assignment are received.

When the ID and the content of the assignment are received, the reception unit 15a transmits the received ID and the content of the assignment to the student terminal 3 through the network 5 using an IP address registered in the student DB 14a. Then, as will be described below, an ID of student (a student ID), a selection result of approval or disapproval about the transmitted content of the assignment and an opinion about the content of the assignment are transmitted from the student terminal 3 to the teacher terminal 2 through the network 5. By doing this, the reception unit 15a may receive the student ID, the opinion of the student or the selection result of approval or disapproval from the student terminal 3.

Also, the reception unit 15a acquires a limitation time associated with the received ID of the assignment from the assignment DB 14b. Subsequently, the reception unit 15a receives the student ID, the selection result of approval or disapproval, and the opinion about the content of the assignment transmitted from the student terminal 3 during a time period until the acquired limitation time elapses after transmitting the ID and the content of the assignment to the student terminal 3. When the student ID, the selection result of approval or disapproval and the opinion about the content of the assignment are received, the reception unit 15a performs the following process. That is, the reception unit 15a specifies a table 14c_1 in which the received ID of the assignment is registered in the "assignment ID" field among the plurality of tables 14c_1 of the assignment reply DB 14c. Also, the reception unit 15a adds a new record in the table 14c_1, registers the received selection result of approval or disapproval in the "approval/disapproval" field of the added record and registers the received opinion in the "opinion content" field of the added record. Further, the reception unit 15a registers the received student ID in the "student ID" field of the added record.

Also, the reception unit 15a registers each of the coordinates of the upper left, the lower left, the upper right and the lower right of the four corners of the area in which the opinion registered in the "opinion content" field is displayed in top portion of each of fields for the upper left, the lower left, the upper right and the lower right of the added record. Further, the reception unit 15a generates the coordinates of the four corners of the area in which the opinion registered is displayed such that the received plurality of opinions are displayed in a matrix shape, and registers the generated coordinates in the added record. Further, the reception unit 15a generates each of the coordinates of the four corners of a predetermined frame area determined for the area in which the opinion is displayed and registers each of the generated coordinates in bottom portion of each of the fields for the upper left, the lower left, the upper right and the lower right of the added record, respectively.

By performing the processes described above, the reception unit 15a registers the following data in the specified table 14c_1 together with the selection result of approval or disapproval and the opinion about the content of the assignment received during a time period until the acquired limitation time elapses. That is, the reception unit 15a registers the IDs of students, the coordinates of the four corners of the area in which the opinion is displayed and coordinates of the four corners of the predetermined frame area together with the selection result and the opinion in the specified table 14c_1.

Figure 9:
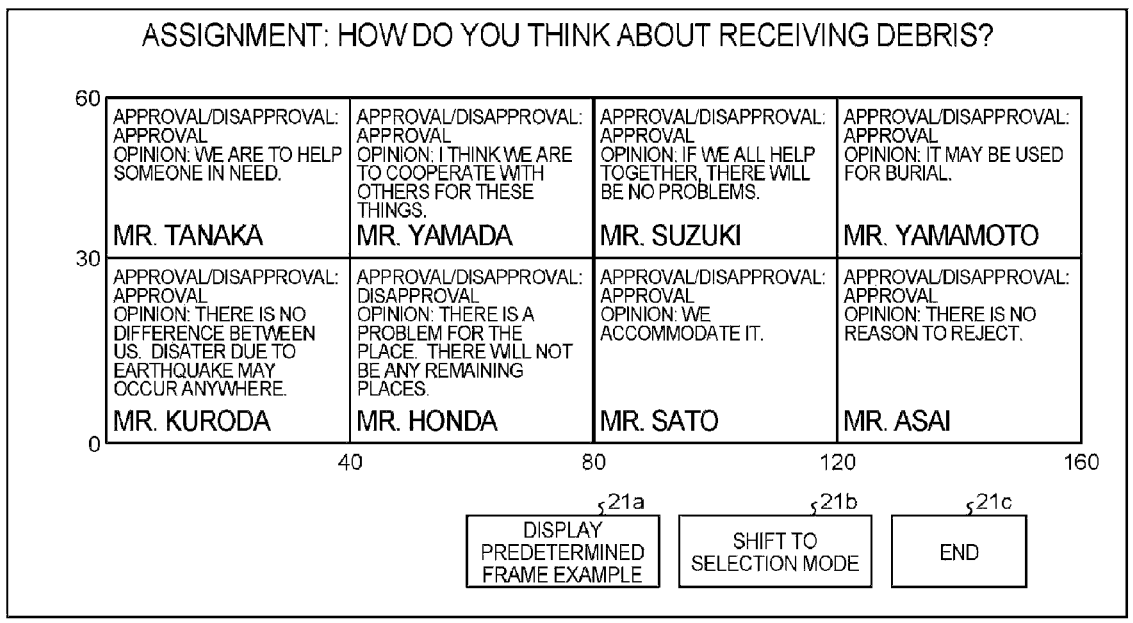
FIG. 9 is a view illustrating an example of a displayed content when a selection result, content of opinion and a family name of student are displayed on a display unit or an electronic blackboard in a matrix shape.

When the limitation time elapses, the reception unit 15a controls the display unit 12 to display the selection result of approval or disapproval and the opinion in a matrix shape. Further, the reception unit 15a controls the projector 4b to display the selection result of approval or disapproval, and the opinion on the electronic blackboard 4a in a matrix shape. An example of process performed by the reception unit 15a to control the display unit 12 and the projector 4b to display the selection result of approval or disapproval and the opinion in a matrix shape will be described. For example, the reception unit 15a acquires registered contents of the fields for the "student ID", the "approval or disapproval", the "opinion content", and the "opinion display area coordinate and predetermined frame area coordinate" of all the records of the specified table 14c_1. Also, the reception unit 15a acquires the family name of the student identified by the ID registered in the "student ID" field from the student DB 14a with respect to each of all the records. Also, the reception unit 15a controls the display unit 12 and the projector 4b to display the selection result registered in the "approval/disapproval" field, the content of the opinion registered in the "opinion content" field, and the associated family name of the student as follows, with respect to each of all the records. That is, the reception unit 15a controls the display unit 12 and the projector 4b to display the selection result, the content of the opinion, and the family name of student in the area specified by coordinates of the four corners registered in the top portion of the "opinion display area coordinate and predetermined frame area coordinate" field. The processes described above are performed by the reception unit 15a, such that the selection result, the content of opinion and the family name of student are displayed in a matrix shape by being associated with one another in the display unit 12 and the electronic blackboard 4a. FIG. 9 is a view illustrating an example of displayed content when a selection result, a content of opinion and a family name of student are displayed on a display unit or an electronic blackboard in a matrix shape. For example, when the registered contents of the fields for the "student ID", the "approval/disapproval", the "opinion content" and the "opinion display area coordinate and predetermined frame area coordinate" of all the records of the table 14c_1 as illustrated in the example of FIG. 5 are acquired, the reception unit 15a performs the following process. That is, the reception unit 15a controls the display unit 12 to display the content as indicated in the example of FIG. 9. Additionally, the reception unit 15a controls the projector 4b to display the content as indicated in the example of FIG. 9 on the electronic blackboard 4a. Here, each number of "40", "80", "120" and "160" arranged in a horizontal direction indicates that the X-coordinate from the origin of coordinate "0" in the example of FIG. 9, and may not actually be displayed. Further, each number of "30" and "60" arranged in a vertical direction indicates that the Y-coordinate from the origin of coordinate "0" in the example of FIG. 9, and may not actually be displayed. Further, the button 21a is a button for executing the predetermined frame displaying process. Further, the button 21b is a button for shifting to a selection mode to be described. Further, the button 21c is a button for closing a screen in which the contents illustrated in FIG. 9 is represented.

The example of FIG. 9 represents a case where the selection result "approval" and the opinion "We are to help others in need" of the student "Tanaka" are displayed in an area specified by coordinates of the four corners (e.g., upper left coordinate (0, 60), lower left coordinate (0, 30), upper right coordinate (40, 60), lower right coordinate (40, 30)). The same rule applies with opinions of other students.

Further, the reception unit 15a may transmit an instruction to display the selection result of approval or disapproval and the opinion that are received in a matrix shape to the student terminal 3. By doing this, the screen containing the contents as illustrated in the example of FIG. 9 is displayed.

Also, the reception unit 15a determines whether the teacher depresses the button 21a through the input unit 11, which is the touch panel, using the touch pen to determine whether an instruction to execute a predetermined frame displaying process which displays an example of a predetermined frame. Here, the reception unit 15a may determine whether the teacher manipulates the electronic pen to depress the button 21a on the opinion displayed on the electronic blackboard 4a to determine whether the instruction to execute the predetermined frame displaying process is received. Further, when it is determined that the instruction to execute the predetermined frame displaying process is received by the reception unit 15a, the predetermined frame displaying process is executed by the setting unit 15b.

Further, the reception unit 15a determines whether a mark input in handwriting by the manipulation of the touch pen by the teacher exists based on the input result from the input unit 11 which is the touch panel provided on the display unit 12. Also, the reception unit 15a may determine whether a mark input in handwriting due to the manipulation of the electronic pen by the teacher exists on the opinions displayed on the electronic blackboard 4a.

When it is determined that the mark input in handwriting exists, the reception unit 15a controls the display unit 12 to display the mark input in handwriting on the opinions displayed in a matrix shape. Further, the reception unit 15a controls the projector 4b to display the mark input in handwriting on the opinions displayed on the electronic blackboard 4a in a matrix shape. By the processes described above, the mark input in handwriting is displayed on the opinions displayed on the electronic blackboard 4a or the display unit 12.

Figure 10:
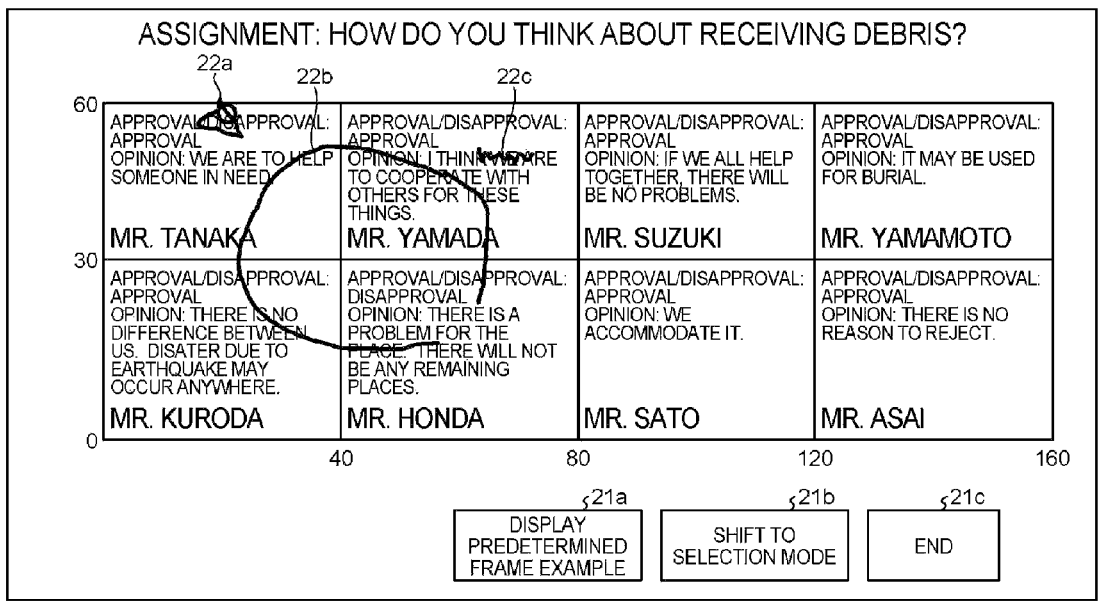
FIG. 10 is a view for explaining an example of a mark input in handwriting.

FIG. 10 is a view for explaining an example of a mark input in handwriting. The example of FIG. 10 indicates examples of various marks displayed on the opinion displayed in a matrix shape indicated in the example of FIG. 9. The example of FIG. 10 indicates a case where a mark 22a having a star shape is input in handwriting onto a moral opinion "We are to help others in need" replied by the student "Tanaka". Further, the example of FIG. 10 indicates a case where a mark 22b having substantially a circular shape which integrates a plurality of convincing opinions replied by the students "Kuroda", "Tanaka", "Yamada" and "Honda" who replied their opinions about why they agree is input in handwriting. Further, the example of FIG. 10 indicates a case where a mark 22c drawn in a broken line for emphasizing a key word "collaboration" of an opinion "I think that we should collaborate with each other for solving these" is input in handwriting.

The reception unit 15a controls the display unit 12 to display the mark input in handwriting on the opinions and the projector 4b to display the mark input in handwriting on the opinions displayed on the electronic blackboard 4a and then, performs the following process. That is, the reception unit 15a acquires the coordinate of the start point and the coordinate of the end point of the mark input in handwriting every one stroke. Further, the reception unit 15a acquires the progressed coordinates that are the coordinates of points between the start point and the end point of the mark along the mark at regular intervals. Further, the reception unit 15a generates an ID of a new mark not registered in the handwriting-input mark coordinate DB 14d.

Also, the reception unit 15a adds the new record in the handwriting-input mark coordinate DB 14d and registers the ID of the generated mark in the "mark ID" field of the added record. The reception unit 15a registers the coordinate of the start point of the mark input in handwriting in the "start point coordinate" field of the added record. Further, the reception unit 15a registers the coordinate of the end point of the mark input in handwriting in the "end point coordinate" field of the added record. The reception unit 15a registers the progressed coordinates of the mark input in handwriting in the "progressed coordinate" field of the added record. As described above, the reception unit 15a registers the coordinate of the start point, the progressed coordinates and the coordinate of the end point of the received mark in the handwriting-input mark coordinate DB 14d.

Further, the reception unit 15a determines whether the teacher depresses the button 21a through the input unit 11, which is the touch panel, using the touch pen to determine whether an instruction to shift to a selection mode for selecting an opinion intended to be displayed in an enlarged scale is received. Here, the reception unit 15a may determine whether the teacher manipulates the electronic pen to depress the button 21a on the opinion displayed on the electronic blackboard 4a to determine whether the instruction to shift to the selection mode is received. Further, when it is determined that the instruction to shift to the selection mode is received by the reception unit 15a, the changing unit 15c shifts to the selection mode and executes the opinion displaying process.

Further, the reception unit 15a determines whether a request to end is input from the input unit 11 due to the manipulation of the input unit 11, which is the touch panel, by the teacher using the touch pen. When it is determined that the request to end is input, the reception unit 15a ends the display control process.

Referring back to the description of FIG. 2, the setting unit 15b executes the predetermined frame displaying process to set a range of predetermined frame to be described below. One aspect of the setting unit 15b will be described. When it is determined that the instruction to execute the predetermined frame displaying process is received by the reception unit 15a, the setting unit 15b executes the predetermined frame displaying process.

In the predetermined frame displaying process, the setting unit 15b first specifies a predetermined area among all of the areas in which the opinion is displayed and generates a predetermined frame display screen which is a screen in which the predetermined frame determined for the specified area is displayed on the opinion. Also, the setting unit 15b controls the display unit 12 to display the generated predetermined frame display screen. Further, the setting unit 15b controls the projector 4b to display the generated predetermined frame display screen on the electronic blackboard 4a.

An example of the predetermined frame display screen generation method will be described. For example, the setting unit 15b acquires registered contents of the fields for the "student ID", the "approval or disapproval", the "opinion content", and the "opinion display area coordinate and predetermined frame area coordinate" of all the records of the table 14c_1 specified by the reception unit 15a. Also, the setting unit 15b acquires the family name of the student identified by the ID registered in the "student ID" field from the student DB 14a with respect to each of all the records. Also, the setting unit 15b generates a predetermined frame display screen, in which the selection result registered in the "approval/disapproval" field, the content of the opinion registered in the "opinion content" field and the associated family name of the student are associated with one another, which is disposed in an area as in the following description. That is, the setting unit 15b generates a predetermined frame display screen, in which the selection result, the content of the opinion and the family name are associated with one another, which is disposed in an area specified by the coordinates of the four corners acquired from the top portion of the "opinion display area coordinate and predetermined frame area coordinate" field, with respect to each of all the records. Accordingly, the opinion is displayed in a matrix shape in the predetermined frame display screen.

Also, the setting unit 15b disposes the mark based on various information registered in the handwriting-input mark coordinate DB 14d on the opinion displayed in a matrix shape to update the predetermined frame display screen. Subsequently, the setting unit 15b specifies a predetermined area among all the areas in which the opinion is displayed. Also, the setting unit 15b also disposes the predetermined frame determined for the specified area on the opinion displayed in a matrix shape to update the predetermined frame display screen.

Figure 11:
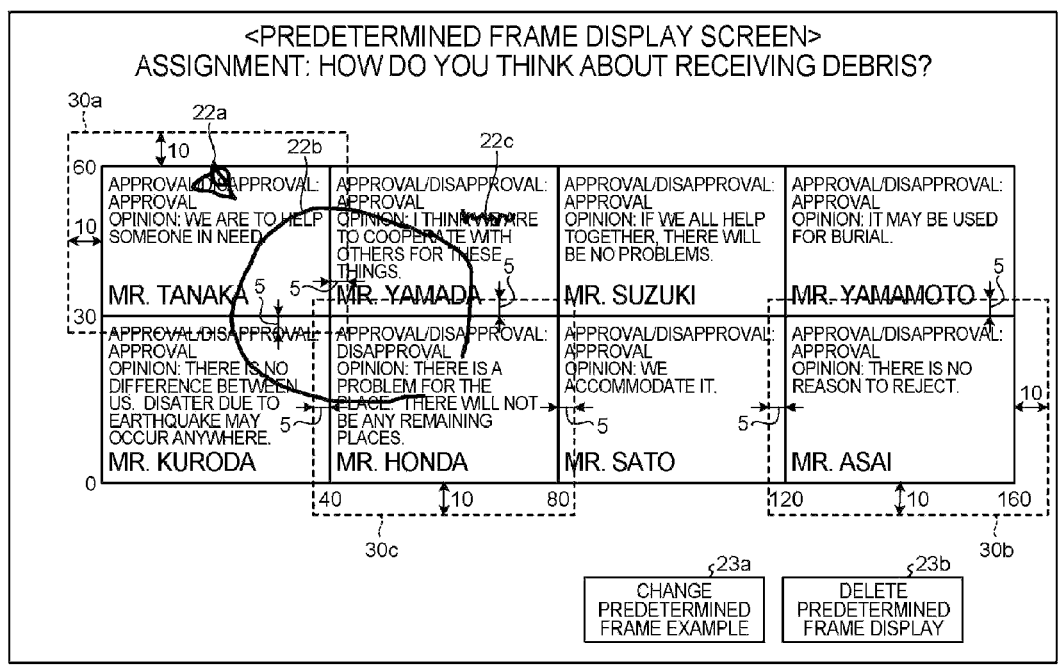
FIG. 11 is a view illustrating an example of a predetermined frame display screen.

FIG. 11 is a view illustrating an example of a predetermined frame display screen. For example, when the registered contents of the fields for the "student ID", the "approval or disapproval", the "opinion content", and the "opinion display area coordinate and predetermined frame area coordinate" of all the records of the table 14c_1 illustrated in the example of FIG. 5 described above are acquired, the setting unit 15b performs the following process. That is, the setting unit 15b acquires the family name of the student identified by the ID registered in the "student ID" field from the student DB 14a with respect to each of all the records. Also, the setting unit 15b generates a predetermined frame display screen, in which the selection result registered in the "approval/disapproval" field, the content of the opinion registered in the "opinion content" field and the family name of the student are associated with one another, which is disposed in an area as in the following description. That is, as illustrated in the example of FIG. 11, the setting unit 15b generates a predetermined frame display screen, in which the selection result, the content of the opinion and the family name are associated with one another, which is disposed in an area specified by the coordinates of the four corners acquired from the top portion of the "opinion display area coordinate and predetermined frame area coordinate" field, with respect to each of all the records. Subsequently, the setting unit 15b disposes the marks 22a, 22b, 22c on the opinion to update the predetermined frame display screen as illustrated in the example of FIG. 11 using information of various marks registered in the handwriting-input mark coordinate DB 14d. Also, the setting unit 15b specifies the predetermined areas, for example, an upper left area, a lower right area and a second area from right in the bottom row, among all the areas in which the opinions are displayed as illustrated in the example of FIG. 11. Also, the setting unit 15b also disposes the predetermined frames 30a, 30b, 30c, which are determined for the specified area, on the opinion displayed in a matrix shape to update the predetermined frame display screen. Further, the button 23a in the example of FIG. 11 is a button for displaying the excess area setting screen to be described below. Further, the button 23b is a button for closing the predetermined frame display screen and displaying a previous screen in which the predetermined frame display screen was not displayed. Also, the setting unit 15b controls the display unit 12 to display the update predetermined frame display screen. Further, the setting unit 15b controls the projector 4b to display the update predetermined frame display screen on the electronic blackboard 4a.

In the present embodiment, as illustrated in the example of FIG. 11, the ranges of the areas of the predetermined frames 30a, 30b, 30c determined for areas located at the outermost side among a plurality of areas in which the opinions are displayed are set to be larger outwardly. For example, an excess width corresponds to a width which amounts to a range that the areas of the predetermined frames 30a, 30b, 30c exceed the areas in which the opinions are displayed. The excess width is 5 cm in a direction where the area in which the opinion is displayed exists. Further, the excess width is 10 cm in a direction where the area in which the opinion is displayed does not exist.

Also, the setting unit 15b determines whether the teacher depresses the button 23a through the input unit 11, which is the touch panel, using the touch pen to determine whether an instruction to display the excess area setting screen is received. Here, the setting unit 15b may determine whether the teacher manipulates the electronic pen to depress the button 23a on the opinion displayed on the electronic blackboard 4a to determine whether the instruction to display the excess area setting screen is received.

Figure 12:
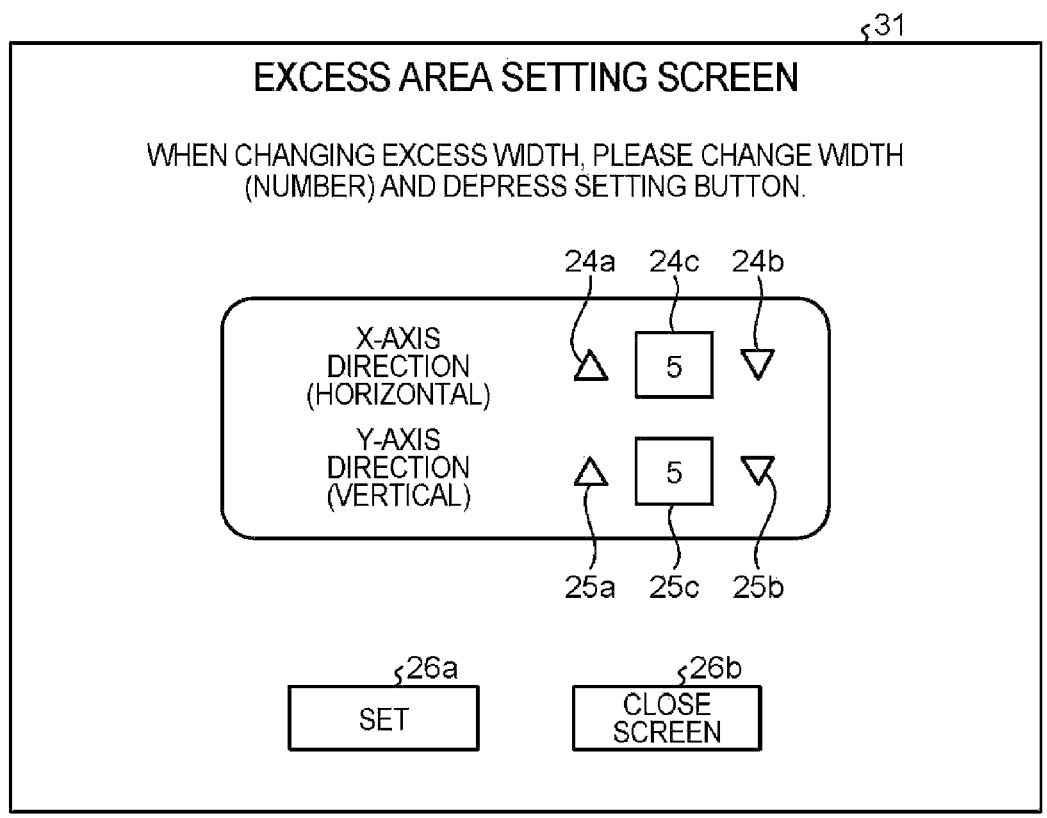
FIG. 12 is a view illustrating an example of an excess area setting screen.

When it is determined that the instruction to display the excess area setting screen is received, the setting unit 15b controls the display unit 12 to display the excess area setting screen. FIG. 12 is a view illustrating an example of the excess area setting screen. As illustrated in the example of FIG. 12, the excess area setting screen 31 includes an area 24c in which the excess width in the X-axis direction is displayed. Further, the excess area setting screen 31 includes a button 24a for increasing the excess width displayed in the area 24c one at a time and a button 24b for decreasing the excess width displayed in the area 24c one at a time. Further, the excess area setting screen 31 includes an area 25c in which the excess width in the Y-axis direction is displayed. Further, the excess area setting screen 31 includes a button 25a for increasing the excess width displayed in the area 25c one at a time and a button 25b for decreasing the excess width displayed in the area 25c one at a time. Further, the excess area setting screen 31 includes a button 26a for newly setting the excess width displayed in each of the area 24c and the area 25c. Further, the excess area setting screen 31 includes a button 26b for closing the excess area setting screen 31 and displaying a previous predetermined frame display screen in which the excess area setting screen 31 was not displayed.

Also, the setting unit 15b determines whether the button 26b is depressed through the input unit 11, which is the touch panel, by the teacher using the touch pen to determine whether an instruction to close the excess area setting screen 31 is received. When it is determined that the instruction to close the excess area setting screen 31 is received, the setting unit 15b closes the excess area setting screen 31 and controls the display unit 12 to display the predetermined frame display screen.

Further, the setting unit 15b determines whether the button 26a is depressed through the input unit 11, which is the touch panel, by the teacher using the touch pen to determine whether instruction to newly set the excess area width is received. When it is determined that the instruction to newly set the excess width is received, the setting unit 15b executes a predetermined frame changing process.

In the predetermined frame changing process, the setting unit 15b first acquires the excess width in the X-axis direction displayed in the area 24c, and registers the acquired excess width in the X-axis direction in the "excess width" field in the X-axis direction of the predetermined frame determining TBL 14e. Further, the setting unit 15b acquires the excess width in the Y-axis direction displayed in the area 25c, and registers the acquired excess width in the Y-axis direction in the "excess width" field in the Y-axis direction of the predetermined frame determining TBL 14e. By doing this, the setting unit 15b updates the registered contents in the "excess width" fields in the X-axis direction and Y-axis direction of the predetermined frame determining TBL 14e.

Also, the setting unit 15b acquires the excess width and the correction width registered in each of the "excess width" field and the "correction width" field in the X-axis direction and Y-axis direction of the updated predetermined frame determining TBL 14e.

Subsequently, the setting unit 15b selects unselected records one by one among all of the records of the table 14c_1 in which the ID of assignment received by the reception unit 15a is registered in the "assignment ID" field. Also, the setting unit 15b performs the following process each time when a single unselected record is selected.

That is, the setting unit 15b acquires a coordinate registered in the top portion of the "upper left" field of the selected record. Also, the setting unit 15b determines whether a record that the acquired coordinate is registered in the top portion of the "upper right" field exists among all of the records of the table 14c_1 in which the ID of assignment received by the reception unit 15a is registered in the "assignment ID" field.

When it is determined that the record that the acquired coordinate is registered in the top portion of the "upper right" field does not exist, the setting unit 15b determines whether a record that the acquired coordinate is registered in the top portion of the "lower left" field exists among all of the records of the table 14c_1 in which the ID of assignment received by the reception unit 15a is registered in the "assignment ID" field. When it is determined that the record that the acquired coordinate is registered in the top portion of the "lower left" field does not exist, the setting unit 15b performs the following process. That is, the setting unit 15b registers a value, which is obtained by subtracting the acquired excess width in the X-axis direction and the correction width in the X-axis direction from X-coordinate of the acquired coordinates, in X-coordinate of the coordinates registered in the bottom portion of the "upper left" field of the selected record, and updates the X-coordinate. Additionally, the setting unit 15b registers a value, which is obtained by adding the acquired excess width in the Y-axis direction and the correction width in the Y-axis direction to Y-coordinate of the acquired coordinates, in Y-coordinate of the coordinates registered in the bottom portion of the "upper left" field of the selected record, and updates the Y-coordinate.

In the meantime, when it is determined that the record that the acquired coordinate is registered in the top portion of the "lower left" field exists, the setting unit 15b performs the following process. That is, the setting unit 15b registers a value, which is obtained by subtracting the acquired excess width in the X-axis direction and the correction width in the X-axis direction from X-coordinate of the acquired coordinates, in X-coordinate of the coordinates registered in the bottom portion of the "upper left" field of the selected record, and updates the X-coordinate. Additionally, the setting unit 15b registers a value, which is obtained by adding the acquired excess width in the Y-axis direction to Y-coordinate of the acquired coordinates, in Y-coordinate of the coordinates registered in the bottom portion of the "upper left" field of the selected record, and updates the Y-coordinate.

Further, when it is determined that the record that the acquired coordinate is registered in the top portion of the "upper right" field exists, the setting unit 15b determines whether a record that the acquired coordinate is registered in the top portion of the "lower right" field exists among all of the records of the table 14c_1 in which the ID of assignment received by the reception unit 15a is registered in the "assignment ID" field.

When it is determined that the record that the acquired coordinate is registered in the top portion of the "lower right" field does not exist, the setting unit 15b registers a value, which is obtained by subtracting the acquired excess width in the X-axis direction from X-coordinate of the acquired coordinates, in X-coordinate of the coordinates registered in the bottom portion of the "upper left" field of the selected record, and updates the X-coordinate. Additionally, the setting unit 15b registers a value, which is obtained by adding the acquired excess width in the Y-axis direction and the correction width in the Y-axis direction to Y-coordinate of the acquired coordinates, in Y-coordinate of the coordinates registered in the bottom portion of the "upper left" field of the selected record, and updates the Y-coordinate.

In the meantime, when it is determined that the record that the acquired coordinate is registered in the top portion of the "lower right" field exists, the setting unit 15b registers a value, which is obtained by subtracting the acquired excess width in the X-axis direction from X-coordinate of the acquired coordinates, in X-coordinate of the coordinates registered in the bottom portion of the "upper left" field of the selected record, and updates the X-coordinate. Additionally, the setting unit 15b registers a value, which is obtained by adding the acquired excess width in the Y-axis direction to Y-coordinate of the acquired coordinates, in Y-coordinate of the coordinates registered in the bottom portion of the "upper left" field of the selected record, and updates the Y-coordinate.

Subsequently, the setting unit 15b acquires a coordinate registered in the top portion of the "lower left" field of the selected record. Also, the setting unit 15b determines whether a record that the acquired coordinate is registered in the top portion of the "lower right" field exists among all of the records of the table 14c_1 in which the ID of assignment received by the reception unit 15a is registered in the "assignment ID" field.

When it is determined that the record that the acquired coordinate is registered in the top portion of the "lower right" field does not exist, the setting unit 15b determines whether a record that the acquired coordinate is registered in the top portion of the "upper left" field exists among all of the records of the table 14c_1 in which the ID of assignment received by the reception unit 15a is registered in the "assignment ID" field. When it is determined that the record that the acquired coordinate is registered in the top portion of the "upper left" field does not exist, the setting unit 15b registers a value, which is obtained by subtracting the acquired excess width in the X-axis direction and the correction width in the X-axis direction from X-coordinate of the acquired coordinates, in X-coordinate of the coordinates registered in the bottom portion of the "lower left" field of the selected record, and updates the X-coordinate. Additionally, the setting unit 15b registers a value, which is obtained by subtracting the acquired excess width in the Y-axis direction and the correction width in the Y-axis direction from Y-coordinate of the acquired coordinates, in Y-coordinate of the coordinates registered in the bottom portion of the "lower left" field of the selected record, and updates the Y-coordinate.

In the meantime, when it is determined that the record that the acquired coordinate is registered in the top portion of the "upper left" field exists, the setting unit 15b performs the following process. That is, the setting unit 15b registers a value, which is obtained by subtracting the acquired excess width in the X-axis direction and the correction width in the X-axis direction from X-coordinate of the acquired coordinates, in X-coordinate of the coordinates registered in the bottom portion of the "lower left" field of the selected record, and updates the X-coordinate. Additionally, the setting unit 15b registers a value, which is obtained by subtracting the acquired excess width in the Y-axis direction from Y-coordinate of the acquired coordinates, in Y-coordinate of the coordinates registered in the bottom portion of the "lower left" field of the selected record, and updates the Y-coordinate.

Further, when it is determined that the record that the acquired coordinate is registered in the top portion of the "lower right" field exists, the setting unit 15b performs the following process. That is, the setting unit 15b determines whether a record that the acquired coordinate is registered in the top portion of the "upper right" field exists among all of the records of the table 14c_1 in which the ID of assignment received by the reception unit 15a is registered in the "assignment ID" field.

When it is determined that the record that the acquired coordinate is registered in the top portion of the "upper right" field does not exist, the setting unit 15b performs the following process. That is, the setting unit 15b registers a value, which is obtained by subtracting the acquired excess width in the X-axis direction from X-coordinate of the acquired coordinates, in X-coordinate of the coordinates registered in the bottom portion of the "lower left" field of the selected record, and updates the X-coordinate. Additionally, the setting unit 15b registers a value, which is obtained by subtracting the acquired excess width in the Y-axis direction and the correction width in the Y-axis direction from Y-coordinate of the acquired coordinates, in Y-coordinate of the coordinates registered in the bottom portion of the "lower left" field of the selected record, and updates the Y-coordinate.

In the meantime, when it is determined that the record that the acquired coordinate is registered in the top portion of the "upper right" field exists, the setting unit 15b performs the following process. That is, the setting unit 15b registers a value, which is obtained by subtracting the acquired excess width in the X-axis direction from X-coordinate of the acquired coordinates, in X-coordinate of the coordinates registered in the bottom portion of the "lower left" field of the selected record, and updates the X-coordinate. Additionally, the setting unit 15b registers a value, which is obtained by subtracting the acquired excess width in the Y-axis direction to Y-coordinate of the acquired coordinates, in Y-coordinate of the coordinates registered in the bottom portion of the "lower left" field of the selected record, and updates the Y-coordinate.

Subsequently, the setting unit 15b acquires a coordinate registered in the top portion of the "upper right" field of the selected record. Also, the setting unit 15b determines whether a record that the acquired coordinate is registered in the top portion of the "upper left" field exists among all of the records of the table 14c_1 in which the ID of assignment received by the reception unit 15a is registered in the "assignment ID" field.

When it is determined that the record that the acquired coordinate is registered in the top portion of the "upper left" field does not exist, the setting unit 15b performs the following process. That is, the setting unit 15b determines whether a record that the acquired coordinate is registered in the top portion of the "lower right" field exists among all of the records of the table 14c_1 in which the ID of assignment received by the reception unit 15a is registered in the "assignment ID" field. When it is determined that the record that the acquired coordinate is registered in the top portion of the "lower right" field does not exist, the setting unit 15b performs the following process. That is, the setting unit 15b registers a value, which is obtained by adding the acquired excess width in the X-axis direction and the correction width in the X-axis direction to X-coordinate of the acquired coordinates, in X-coordinate of the coordinates registered in the bottom portion of the "upper right" field of the selected record, and updates the X-coordinate. Additionally, the setting unit 15b registers a value, which is obtained by adding the acquired excess width in the Y-axis direction and the correction width in the Y-axis direction to Y-coordinate of the acquired coordinates, in Y-coordinate of the coordinates registered in the bottom portion of the "upper right" field of the selected record, and updates the Y-coordinate.

In the meantime, when it is determined that the record that the acquired coordinate is registered in the top portion of the "lower right" field exists, the setting unit 15b performs the following process. That is, the setting unit 15b registers a value, which is obtained by adding the acquired excess width in the X-axis direction and the correction width in the X-axis direction to X-coordinate of the acquired coordinates, in X-coordinate of the coordinates registered in the bottom portion of the "upper right" field of the selected record, and updates the X-coordinate. Additionally, the setting unit 15b registers a value, which is obtained by adding the acquired excess width in the Y-axis direction to Y-coordinate of the acquired coordinates, in Y-coordinate of the coordinates registered in the bottom portion of the "upper right" field of the selected record, and updates the Y-coordinate.

Further, when it is determined that the record that the acquired coordinate is registered in the top portion of the "upper left" field exists, the setting unit 15b performs the following process. That is, the setting unit 15b determines whether a record that the acquired coordinate is registered in the top portion of the "lower left" field exists among all of the records of the table 14c_1 in which the ID of assignment received by the reception unit 15a is registered in the "assignment ID" field.

When it is determined that the record that the acquired coordinate is registered in the top portion of the "lower left" field does not exist, the setting unit 15b performs the following process. That is, the setting unit 15b registers a value, which is obtained by adding the acquired excess width in the X-axis direction to X-coordinate of the acquired coordinates, in X-coordinate of the coordinates registered in the bottom portion of the "upper right" field of the selected record, and updates the X-coordinate. Additionally, the setting unit 15b registers a value, which is obtained by adding the acquired correction width in the Y-axis direction and the correction width in the Y-axis direction to Y-coordinate of the acquired coordinates, in Y-coordinate of the coordinates registered in the bottom portion of the "upper right" field of the selected record, and updates the Y-coordinate.

In the meantime, when it is determined that the record that the acquired coordinate is registered in the top portion of the "lower left" field exists, the setting unit 15b performs the following process. That is, the setting unit 15b registers a value, which is obtained by adding the acquired excess width in the X-axis direction to X-coordinate of the acquired coordinates, in X-coordinate of the coordinates registered in the bottom portion of the "upper right" field of the selected record, and updates the X-coordinate. Additionally, the setting unit 15b registers a value, which is obtained by adding the acquired excess width in the Y-axis direction to Y-coordinate of the acquired coordinates, in Y-coordinate of the coordinates registered in the bottom portion of the "upper right" field of the selected record and updates the Y-coordinate.

Subsequently, the setting unit 15b acquires a coordinate registered in the top portion of the "lower right" field of the selected record. Also, the setting unit 15b determines whether a record that the acquired coordinate is registered in the top portion of the "lower left" field exists among all of the records of the table 14c_1 in which the ID of assignment received by the reception unit 15a is registered in the "assignment ID" field.

When it is determined that the record that the acquired coordinate is registered in the top portion of the "lower left" field does not exist, the setting unit 15b performs the following process. That is, the setting unit 15b determines whether a record that the acquired coordinate is registered in the top portion of the "upper right" field exists among all of the records of the table 14c_1 in which the ID of assignment received by the reception unit 15a is registered in the "assignment ID" field. When it is determined that the record that the acquired coordinate is registered in the top portion of the "upper right" field does not exist, the setting unit 15b performs the following process. That is, the setting unit 15b registers a value, which is obtained by adding the acquired excess width in the X-axis direction and the correction width in the X-axis direction to X-coordinate of the acquired coordinates, in X-coordinate of the coordinates registered in the bottom portion of the "lower right" field of the selected record, and updates the X-coordinate. Additionally, the setting unit 15b registers a value, which is obtained by subtracting the acquired excess width in the Y-axis direction and the correction width in the Y-axis direction from Y-coordinate of the acquired coordinates, in Y-coordinate of the coordinates registered in the bottom portion of the "lower right" field of the selected record, and updates the Y-coordinate.

In the meantime, when it is determined that the record that the acquired coordinate is registered in the top portion of the "upper right" field exists, the setting unit 15b performs the following process. That is, the setting unit 15b registers a value, which is obtained by adding the acquired excess width in the X-axis direction and the correction width in the X-axis direction to X-coordinate of the acquired coordinates, in X-coordinate of the coordinates registered in the bottom portion of the "lower right" field of the selected record, and updates the X-coordinate. Additionally, the setting unit 15b registers a value, which is obtained by subtracting the acquired excess width in the Y-axis direction from Y-coordinate of the acquired coordinates, in Y-coordinate of the coordinates registered in the bottom portion of the "lower right" field of the selected record, and updates the Y-coordinate.

Further, when it is determined that the record that the acquired coordinate is registered in the top portion of the "lower left" field exists, the setting unit 15b performs the following process. That is, the setting unit 15b determines whether a record that the acquired coordinate is registered in the top portion of the "upper left" field exists among all of the records of the table 14c_1 in which the ID of assignment received by the reception unit 15a is registered in the "assignment ID" field.

When it is determined that the record that the acquired coordinate is registered in the top portion of the "upper left" field does not exist, the setting unit 15b performs the following process. That is, the setting unit 15b registers a value, which is obtained by adding the acquired excess width in the X-axis direction to X-coordinate of the acquired coordinates, in X-coordinate of the coordinates registered in the bottom portion of the "lower right" field of the selected record and updates the X-coordinate. Additionally, the setting unit 15b registers a value, which is obtained by subtracting the acquired excess width in the Y-axis direction and the correction width in the Y-axis direction from Y-coordinate of the acquired coordinates, in Y-coordinate of the coordinates registered in the bottom portion of the "lower right" field of the selected record and updates the Y-coordinate.

In the meantime, when it is determined that the record that the acquired coordinate is registered in the top portion of the "upper left" field exists, the setting unit 15b performs the following process. That is, the setting unit 15b registers a value, which is obtained by adding the acquired excess width in the X-axis direction to X-coordinate of the acquired coordinates, in X-coordinate of the coordinates registered in the bottom portion of the "lower right" field of the selected record and updates the X-coordinate. Additionally, the setting unit 15b registers a value, which is obtained by subtracting the acquired excess width in the Y-axis direction from Y-coordinate of the acquired coordinates, in Y-coordinate of the coordinates registered in the bottom portion of the "lower right" field of the selected record, and updates the Y-coordinate.

The setting unit 15b performs the process described above each time when an unselected record is selected one by one among all the records of table 14c_1 and ends the predetermined frame changing process when the process described above is performed for all the records. The setting unit 15b may execute the predetermined frame changing process to set a range of all the predetermined frame areas based on the excess width set by the teacher. Further, the setting unit 15b sets the range of the predetermined frame area, which is determined for the area located on the outermost side among the areas in which opinions arranged in a matrix shape are displayed, to be larger in an outer side direction compared to an area which is not located on the outermost side. Here, the mark which is input in handwriting with respect to the opinion displayed on the area located on the outermost side tends to locate on an outer side of the area compared to the mark which is input in handwriting with respect to the opinion displayed on the area which is not located on the outermost side. Therefore, the range of the predetermined frame area is set by the method described above and thus, it is possible to prevent a situation that a portion of the mark input in handwriting is situated outside the range of the predetermined frame from occurring. Accordingly, a degree of emphasis in the mark may be changed in a better accuracy at the time of displaying the opinion in an enlarged scale.

When the predetermined frame changing process ends, the setting unit 15b specifies a predetermined area among all of the areas in which the opinions are displayed and generates the predetermined frame display screen which is a screen in which the predetermined frame determined for the specified area is displayed on the opinion in a range which is set in the predetermined frame changing process. Further, the setting unit 15b generates a predetermined frame display screen in which the predetermined frame is display in a broken line. Also, the setting unit 15b controls the display unit 12 to display the generated predetermined frame display screen. Further, the setting unit 15b controls the projector 4b to display the generated predetermined frame display screen on the electronic blackboard 4a.

Further, when the predetermined frame display screen is displayed on the display unit 12 or the electronic blackboard 4a, the setting unit 15b performs the following process. That is, the setting unit 15b determines whether the button 23b is depressed through the input unit 11, which is the touch panel, by the teacher using the touch pen to determine whether an instruction to close the predetermined frame display screen is received.

When it is determined that the instruction to close the predetermined frame display screen is received, the setting unit 15b controls the display unit 12 to close the predetermined frame display screen and display the previous screen in which the predetermined frame display screen was not displayed. Further, the setting unit 15b controls the projector 4b to close the predetermined frame display screen and display the previous screen in which the predetermined frame display screen was not displayed on the electronic blackboard 4a.

Referring back to the description of FIG. 2, when an opinion intended to be displayed in an enlarged scale is designated, the changing unit 15c changes the degree of emphasis in the mark to be displayed on the display unit 12 or the electronic blackboard 4a according to a positional relationship between the mark and the area in which the designated is displayed. One aspect of the changing unit 15c will be described. When it is determined that the instruction to shift to the selection mode is received by the reception unit 15a, the changing unit 15c shifts to the selection mode to execute the opinion displaying process.

In the opinion displaying process, the changing unit 15c generates the selection mode screen first and controls the display unit 12 to display the generated selection mode screen. Further, the changing unit 15c controls the projector 4b to display the generated selection mode screen on the electronic blackboard 4a.

An example of the selection mode screen generation method will be described. For example, the changing unit 15c acquires registered contents of the fields for the "student ID", the "approval or disapproval", the "opinion content", and the "opinion display area coordinate and predetermined frame area coordinate" of all the records of the table 14c_1 in which the ID of assignment received by the reception unit 15a is registered in the "assignment ID" field. Also, the changing unit 15c acquires the family name of the student identified by the ID registered in the "student ID" field from the student DB 14a with respect to each of all the records. Also, the changing unit 15c generates a selection mode screen, in which the selection result registered in the "approval/disapproval" field, the content of the opinion registered in the "opinion content" field and the associated family name of the student are associated with one another, which is disposed in an area as in the following description. That is, the changing unit 15c generates a selection mode screen, in which the selection result, the content of the opinion and the family name are associated with one another, which is disposed in an area specified by the coordinates of the four corners acquired from the top portion of the "opinion display area coordinate and predetermined frame area coordinate" field, with respect to each of all the records. Further, the changing unit 15c may generate the selection mode screen such that the opinion intended to be displayed in an enlarged scale is selected due to the manipulation of the input unit 11 by the teacher using the touch pen.

Also, the changing unit 15c disposes the mark based on various information registered in the handwriting-input mark coordinate DB 14d on the opinion displayed in a matrix shape, and updates the predetermined frame display screen.

FIG. 13 is a view illustrating an example of a selection mode screen. For example, when the registered contents of the fields for the "student ID", the "approval or disapproval", the "opinion content", and the "opinion display area coordinate and predetermined frame area coordinate" of all the records of the table 14c_1 illustrated in the example of FIG. 5 described above are acquired, the changing unit 15c performs the following process. That is, the changing unit 15c acquires the family name of the student identified by the ID registered in the "student ID" field from the student DB 14a with respect to each of all the records. Also, the changing unit 15c generates a selection mode screen, in which the selection result registered in the "approval/disapproval" field, the content of the opinion registered in the "opinion content" field and the associated family name of the student are associated with one another, which is disposed in an area as in the following description. That is, as illustrated in the example of FIG. 13, the changing unit 15c generates the selection mode screen, in which the selection result, the content of the opinion and the family name are associated with one another, which is disposed in an area specified by the coordinates of the four corners acquired from the top portion of the "opinion display area coordinate and predetermined frame area coordinate" field, with respect to each of all the records. Subsequently, the changing unit 15c disposes the marks 22a, 22b, 22c on the opinion to update the selection mode screen as illustrated in the example of FIG. 13 using information of various marks registered in the handwriting-input mark coordinate DB 14*d*. Further, the button 27*a* in the example of FIG. 13 is a button for displaying the opinion selected by the teacher in an enlarged scale. Further, the button 27*b* is a button for closing the selection mode screen and displaying the previous screen in which the selection mode screen was not displayed. Also, the changing unit 15*c* controls the display unit 12 to display the updated selection mode screen. Further, the changing unit 15*c* controls the projector 4*b* to display the updated selection mode screen on the electronic blackboard 4*a*.

Also, the changing unit 15*c* determines whether the opinion intended to be displayed in an enlarged scale is selected due to the manipulation of the input unit 11 by the teacher using the touch pen. When it is determined that the opinion intended to be displayed in an enlarged scale is selected by the teacher, the changing unit 15*c* controls the display unit 12 to highlight the frame of the area of the opinion that the selected position exists within an opinion display area. Further, the changing unit 15*c* controls the projector 4*b* to highlight the frame of the area in which the selected opinion is displayed on the electronic blackboard 4*a*. For example, as illustrated in the example of FIG. 13, when the opinion of the student "Tanaka" is selected, the changing unit 15*c* controls the display unit 12 to highlight the frame 32 of the area in which the selected opinion is displayed. Further, the changing unit 15*c* controls the projector 4*b* to highlight the frame 32 on the electronic blackboard 4*a*.

Also, the changing unit 15*c* determines whether the button 27*a* is depressed through the input unit 11, which is the touch panel, by the teacher using the touch pen to determine whether instruction to display the selected opinion in an enlarged scale is received. Here, the reception unit 15*a* may determine whether the teacher manipulates the electronic pen to depress the button 27*a* on the opinion displayed on the electronic blackboard 4*a* to determine whether the instruction to display the selected opinion in an enlarged scale is received.

When it is determined that the instruction to display the selected opinion in an enlarged scale is received, the changing unit 15*c* acquires the coordinates of the start points, the coordinates of the end points and the progressed coordinates of all the marks registered in the handwriting-input mark coordinate DB 14*d*.

Also, the changing unit 15*c* specifies a mark that all of the coordinate of the start point, the coordinate of the end point and the progressed coordinates are included within the predetermined frame determined for the area in which the selected opinion is displayed, among all the marks. For example, in the examples illustrated in FIG. 11 and FIG. 13, the changing unit 15*c* specifies a mark 22 that all of the coordinate of the start point, the coordinate of the end point and the progressed coordinates are included within the predetermined frame 30*a* determined for the area in which the selected opinion is displayed.

Also, the changing unit 15*c* controls the display unit 12 to display the selected opinion and the specified mark in an enlarged scale. Further, the changing unit 15*c* controls the projector 4*b* to display the selected opinion and the specified mark on the electronic blackboard 4*a* in an enlarged scale. Further, the changing unit 15*c* may transmit the instruction to display the selected opinion and the specified mark in an enlarged scale to the student terminal 3. FIG. 14 is a view illustrating an example of a screen in a case of displaying an opinion and a mark in an enlarged scale. When the opinion of the student "Tanaka" is selected as illustrated in the example of FIG. 13, the changing unit 15*c* controls the display unit 12 to display the specified mark 22*a* in an enlarged scale together with the opinion of the student "Tanaka" as illustrated in the example of FIG. 14. Further, the changing unit 15*c* controls the projector 4*b* to display the specified mark 22*a* on the electronic blackboard 4*a* in an enlarged scale together with the opinion of the student "Tanaka" as illustrated in the example of FIG. 14. Though the mark 22*b* has some of the coordinates of the start point and the end point and the progressed coordinates included in the opinion area of the student "Tanaka", but not all of those coordinates are included in the opinion area of the student "Tanaka" and thus, the mark 22*b* does not become a target mark to be displayed in an enlarged scale.

Figure 15:
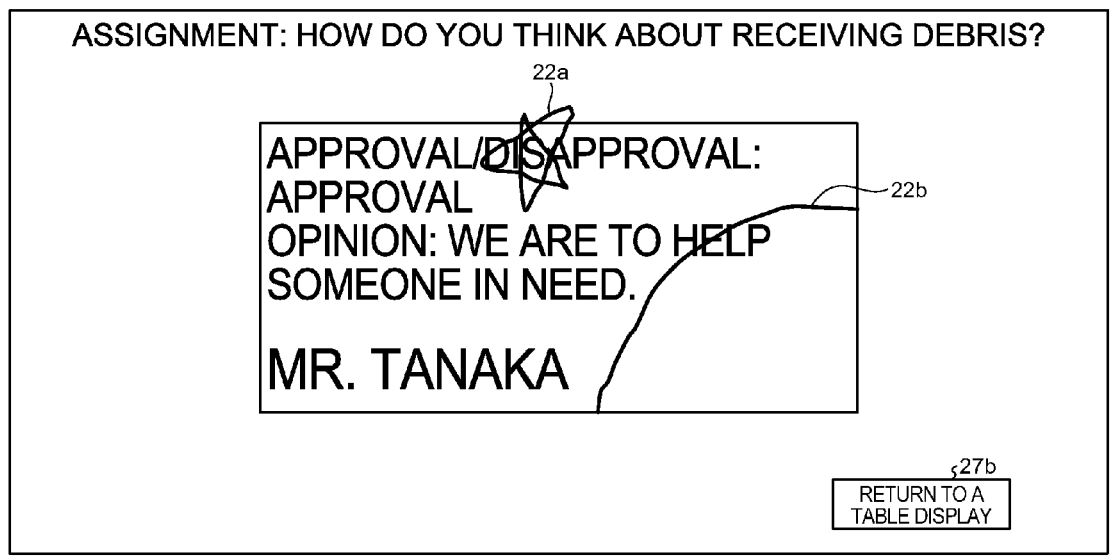
FIG. 15 is a view illustrating another example of the screen in a case of displaying the opinion and the mark in an enlarged scale.
Figure 16:
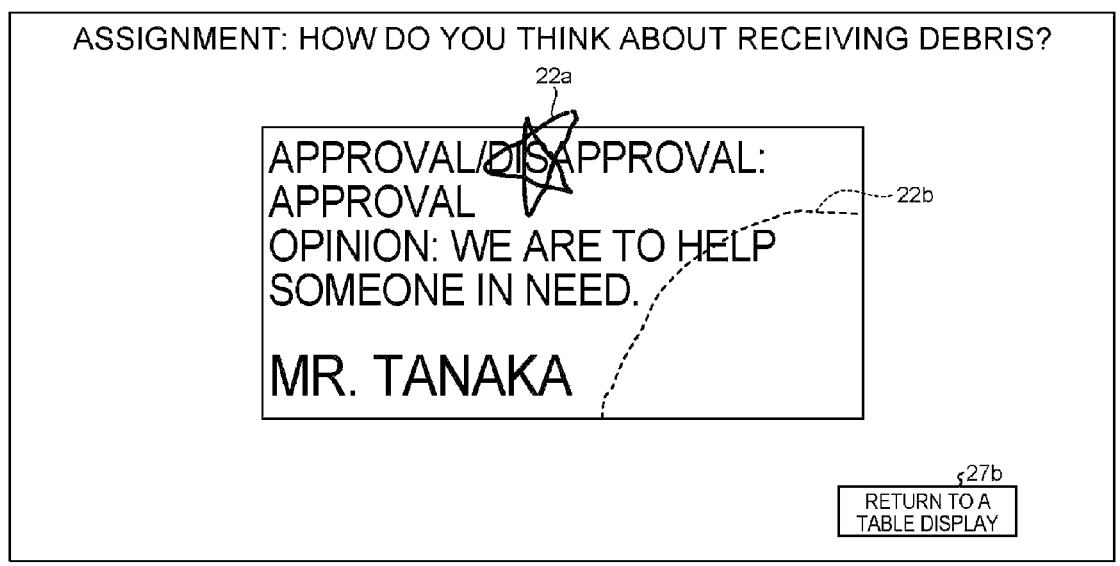
FIG. 16 is a view illustrating another example of the screen in a case of displaying the opinion and the mark in an enlarged scale.
Figure 17:
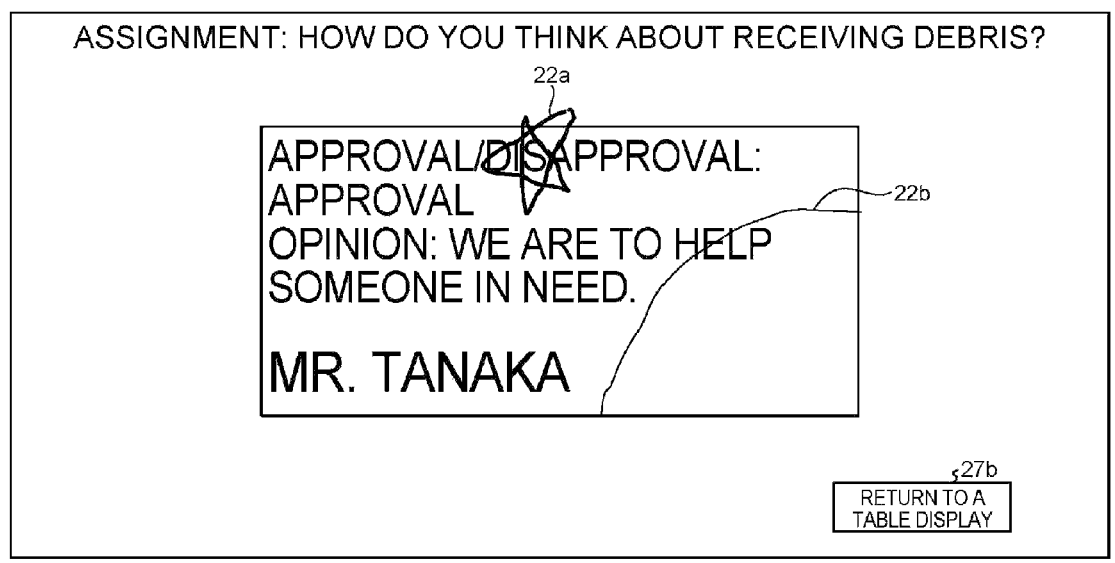
FIG. 17 is a view illustrating another example of the screen in a case of displaying the opinion and the mark in an enlarged scale.

FIG. 15 to FIG. 17 are views illustrating other examples of the screen in a case of displaying the opinion and the mark in an enlarged scale. When the opinion of the student "Tanaka" is selected as illustrated in the example of FIG. 13, the changing unit 15*c* may control the display unit 12 to display the specified mark 22*a* and the mark 22*b* (unspecified mark) that not all of the progressed coordinates are included in the opinion area of the student "Tanaka" in an enlarged scale together with the opinion of the student "Tanaka" as illustrated in FIG. 15. Similarly, the changing unit 15*c* may control the projector 4*b* to display the specified mark 22*a* and the unspecified mark 22*b* on the electronic blackboard 4*a* in an enlarged scale together with the opinion of the student "Tanaka" as illustrated in FIG. 15. In such a case, the changing unit 15*c* makes lower the degree of emphasis the mark 22*b* than that of the mark 22*b* such that the line density of the mark 22*b* becomes thinner than that of the mark 22*a*. Further, the mark 22*b* is a mark that a portion of the mark is displayed on the area in which the opinion of the student "Tanaka" is displayed.

Further, when the opinion of the student "Tanaka" is selected as illustrated in the example of FIG. 13, the changing unit 15*c* may control the display unit 12 to display the mark 22*a* and the mark 22*b* in an enlarged scale together with the opinion of the student "Tanaka" as illustrated in the example of FIG. 16. Similarly, the changing unit 15*c* may control the projector 4*b* to display the specified mark 22*a* and the unspecified mark 22*b* on the electronic blackboard 4*a* in an enlarged scale together with the opinion of the student "Tanaka" as illustrated in FIG. 17. In such a case, the changing unit 15*c* makes lower the degree of emphasis in the mark 22*b* than that of the mark 22*b* such that the line of the mark 22*b* is displayed in a broken line and the line of the mark 22*a* is displayed in a solid line.

Further, when the opinion of the student "Tanaka" is selected as illustrated in the example of FIG. 13, the changing unit 15*c* may control the display unit 12 to display the mark 22*a* and the mark 22*b* in an enlarged scale together with the opinion of the student "Tanaka" as illustrated in the example of FIG. 17. Similarly, the changing unit 15*c* may control the projector 4*b* to display the specified mark 22*a* and the unspecified mark 22*b* on the electronic blackboard 4*a* in an enlarged scale together with the opinion of the student "Tanaka" as illustrated in FIG. 17. In such a case, the changing unit 15*c* makes lower the degree of emphasis in the mark 22*b* than that of the mark 22*b* such that a line width of the mark 22*b* becomes narrower than that of the mark 22*a*.

As described above, in the teacher terminal 2 according to the present embodiment, when the opinion is displayed in an enlarged scale, the degree of emphasis in a mark that has a low relevancy to such an opinion becomes lower than a mark that has a high relevancy to the opinion. Accordingly, the degree of emphasis in a mark that has a low relevancy becomes lower and thus, the opinion displayed in an enlarged scale is allowed to be easily viewed in the teacher terminal 2 according to the present embodiment.

Also, the changing unit 15c determines whether the button 27b is depressed through the input unit 11, which is the touch panel, by the teacher using the touch pen to determine whether an instruction to close the selection mode screen is received. Here, changing unit 15c may determine whether the teacher manipulates the electronic pen to depress the button 27b on the opinion displayed on the electronic blackboard 4a to determine whether the instruction to close the selection mode screen is received.

When it is determined that the instruction to close the selection mode screen is received (specifically, when depressing of the "Return to a table display" button 27b of FIG. 13 is received), the changing unit 15c closes the selection mode screen. Also, the changing unit 15c controls the display unit 12 to generate and display a previous screen in which the selection mode screen was not displayed using the contents registered in the assignment reply DB 14c and the contents registered in the handwriting-input mark coordinate DB 14d. Further, the changing unit 15c controls the projector 4b to display the generated screen on the electronic blackboard 4a. Further, the changing unit 15c may transmit the instruction to display the generated screen to the student terminal 3. Also, the changing unit 15c ends the opinion displaying process.

The control unit 15 is a circuit such as the ASIC (Application Specific Integrated Circuit), FPGA (Field Programmable Gate Array), CPU (Central Processing Unit) or MPU (Micro Processing Unit).

Figure 18:
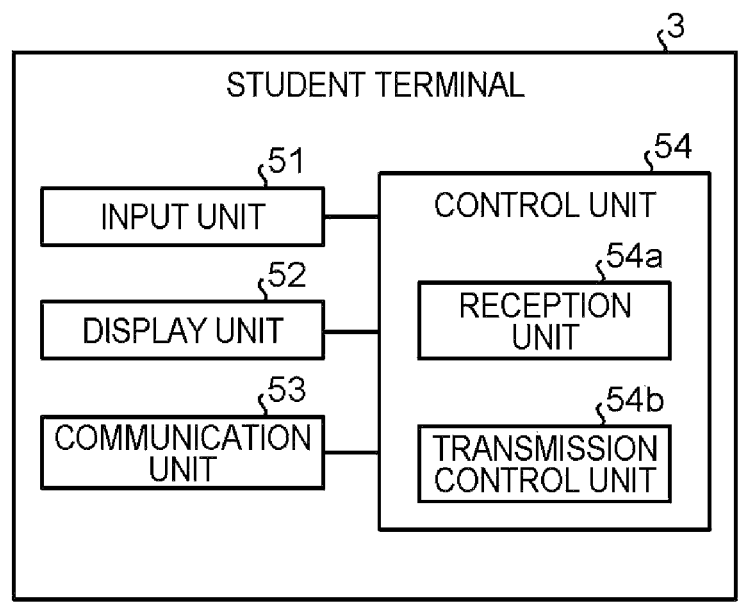
FIG. 18 is a view illustrating an exemplary functional configuration of a student terminal.

Referring back to the description of FIG. 1, the student terminal 3 may be a variety of terminals including, for example, a mobile terminal, such as a slate terminal. The student terminal 3 is used by a student who attends the class. FIG. 18 is a view illustrating an exemplary functional configuration of a student terminal. As illustrated in an example of FIG. 18, the student terminal 3 includes an input unit 51, a display unit 52, a communication unit 53 and a control unit 54.

The input unit 51 inputs various information to the control unit 54. For example, the input unit 51 is a touch panel provided on the display unit 52, and receives manipulation of the touch pen or finger used by student who attends in class and inputs the received manipulation to the control unit 54.

The display unit 52 displays various information. For example, the display unit 52 displays a reply screen to be described below by the control of the reception unit 54a. An example of the display unit 52 may include, for example, a liquid crystal display.

The communication unit 53 may be a communication interface for allowing the student terminal 3 and the teacher terminal 2 to communicate with each other.

The control unit 54 includes an internal memory for storing a program defining various processing sequences or a control data, and executes various processes by the program and the control data. As illustrated in FIG. 18, the control unit 54 includes a reception unit 54a and a transmission control unit 54b.

When the ID and the content of the assignment transmitted from the teacher terminal 2 are received, the reception unit 54a generates the reply screen 60 as illustrated in an example of FIG. 19 using the ID and the content of the assignment. FIG. 19 is a view illustrating an exemplary reply screen. When the student has an opinion of approval for an assignment, the check box 60a illustrated in the example of FIG. 19 is checked due to the manipulation of the input unit 51 by the student. Further, when the student has an opinion of disapproval for the assignment, the check box 60b is checked due to the manipulation of the input unit 51 by the student. The opinion for the assignment is input to a text box 60c due to the manipulation of the input unit 51 by the student. The button 60d illustrated in the example of FIG. 19 is a button for transmitting check results of the check boxes 60a and 60b and the opinion input to the text box 60c to the teacher terminal 2. When the button 60d is depressed, the check results of the check boxes 60a and 60b and the opinion input to the text box 60c are transmitted to the teacher terminal 2 through the communication unit 53 by a transmission control unit 54b to be described below. The button 60e illustrated in the example of FIG. 19 is a button for clearing the check results of the check boxes 60a and 60b and the opinion input to the text box 60c. When the button 60e is depressed, the check results of the check boxes 60a and 60b and the opinion input to the text box 60c are cleared.

When the button 60d is depressed due to the manipulation of the input unit 51 by the student, the transmission control unit 54b transmits the check results of the check boxes 60a and 60b and the opinion input, together with the student ID of the student, to the text box 60c to the teacher terminal 2 through the communication unit 53.

The control unit 54 may be a circuit such as the ASIC (Application Specific Integrated Circuit), FPGA (Field Programmable Gate Array), CPU (Central Processing Unit) or MPU (Micro Processing Unit).

[Flow of Process]

Next, a flow of process executed by the teacher terminal 2 according to the present embodiment will be described. FIG. 20A and FIG. 20B are flowcharts illustrating a sequence of a display control process according to the embodiment. For example, when an instruction to execute the display control process is input to the control unit 15 from the input unit 11, the display control process according to the embodiment is executed by the control unit 15.

As illustrated in FIG. 20A and FIG. 20B, the reception unit 15a generates an assignment selection screen and controls the display unit 12 to display the generated assignment selection screen (S101).

The reception unit 15a determines whether the ID and the content of the assignment associated with the checked check box 20a is received (S102). When it is determined that the ID and the content of the assignment are not received ("NO" at step S102), the reception unit 15a performs the process of step S102 again. That is, the reception unit 15a waits until the ID and the content of the assignment are received.

In the meantime, when it is determined that the ID and the content of the assignment are received ("YES" at step S102), the reception unit 15a transmits the received ID and the content of the assignment to the student terminal 3 through the network 5 using an IP address registered in the student DB 14a (S103).

Also, the reception unit 15a acquires the limitation time associated with the received ID of the assignment from the assignment DB 14b (S104). Subsequently, the reception unit 15a determines whether the student ID, the selection result of approval or disapproval, and the opinion about the content of the assignment are received from the student terminal 3 (S105). When it is determined that the student ID, the selection result of approval or disapproval, and the opinion about the content of the assignment are not received ("NO" at step S105), the reception unit 15a goes to step S108 to be described below.

In the meantime, when it is determined that the selection result of approval or disapproval, the opinion about the content of the assignment, and the student ID are received ("YES" at step S105), the reception unit 15a performs the following process. That is, the reception unit 15a specifies the table 14c_1 in which the received ID of the assignment is registered in the "assignment ID" field among a plurality of the tables 14c_1 of the assignment reply DB 14c. Also, the reception unit 15a adds a new record in the specified table 14c_1, registers the student ID in the "student ID" field of the added record, registers the selection result of approval or disapproval in the "approval/disapproval" field of the added record, and registers the received opinion in the "opinion content" field of the added record (S106).

Also, the reception unit 15a registers each of the coordinates of upper left, lower left, upper right, lower right of the four corners of the area in which the opinion registered in the "opinion content" field is displayed in the top portion of each of the fields for the "upper left", the "lower left", the "upper right", and the "lower right" of the added record. Further, the reception unit 15a generates each of the coordinates of the four corners of the predetermined frame area determined for the area in which the opinion is displayed and registers each of the generated coordinates in bottom portion of each of the fields for the upper left, the lower left, the upper right and the lower right of the added record, respectively (S107).

Also, the reception unit 15a determines whether a limitation time acquired after transmitting the ID and the content of the assignment to the student terminal 3 is elapsed (S108). When it is determined that the acquired limitation time has not elapsed ("NO" at step S108), the reception unit 15a goes back to step S105. In the meantime, when it is determined that the acquired limitation time elapses ("YES" at step S108), the reception unit 15a controls the display unit 12 to display the acquired selection results of approval or disapproval and the opinion in a matrix shape. Further, the reception unit 15a controls the projector 4b to display the received selection results of approval or disapproval and the opinion on the electronic blackboard 4a in a matrix shape (S109).

Also, the reception unit 15a determines whether the teacher depresses the button 21a through the input unit 11, which is the touch panel, using the touch pen to determine whether an instruction to execute a predetermined frame displaying process which displays an example of a predetermined frame. Here, the reception unit 15a may determine whether the teacher manipulates the electronic pen to depress the button 21a on the opinion displayed on the electronic blackboard 4a to determine whether the instruction to execute the predetermined frame displaying process is received (S110).

When it is determined that the instruction to execute a predetermined frame displaying process is not received ("NO" at step S110), the reception unit 15a goes to step S112 to be described below. In the mean time, when it is determined that the instruction to execute the predetermined frame displaying process is received ("YES" at step S110), the setting unit 15b executes the predetermined frame displaying process (S111).

Figure 21:
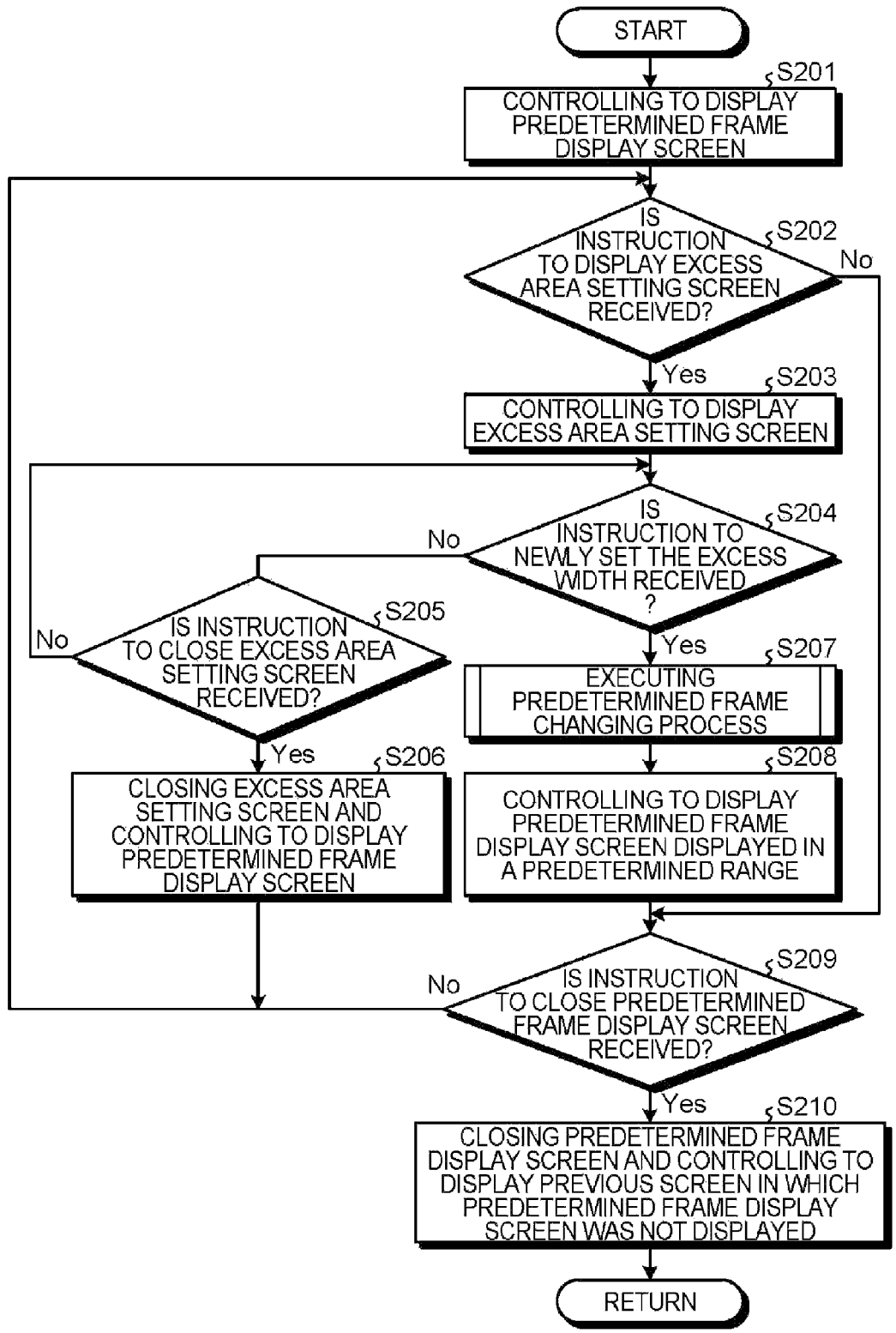
FIG. 21 is a flowchart illustrating a sequence of a predetermined frame displaying process according to the embodiment.
Figure 22A:
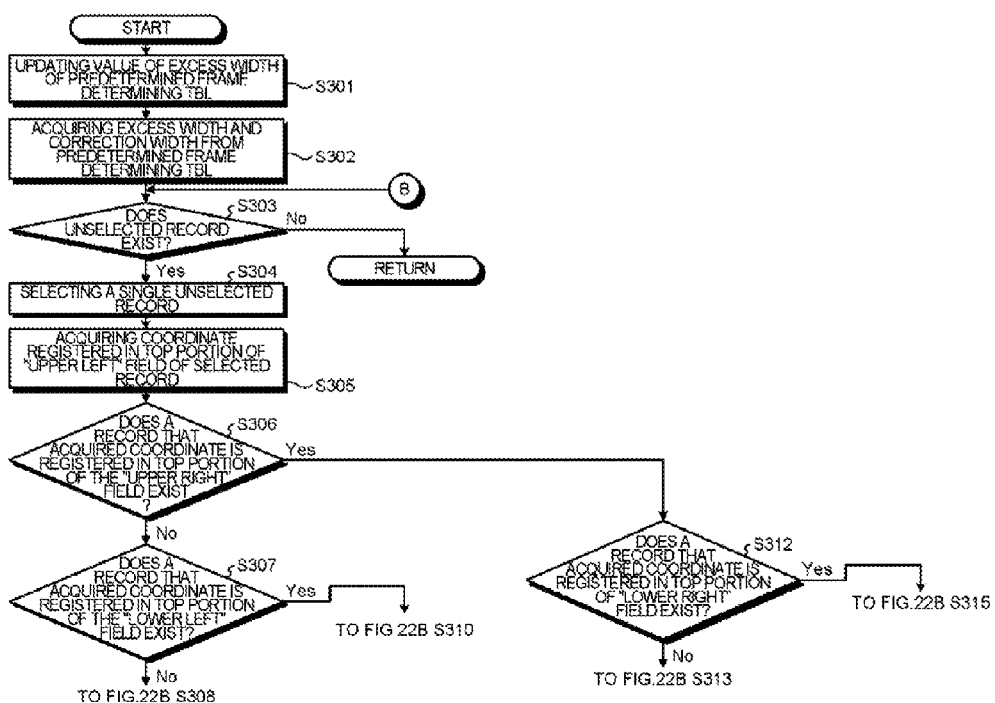
FIG. 22A, FIG. 22B and FIG. 22C are flowcharts illustrating a sequence of a predetermined frame changing process according to the embodiment.
Figure 22B:
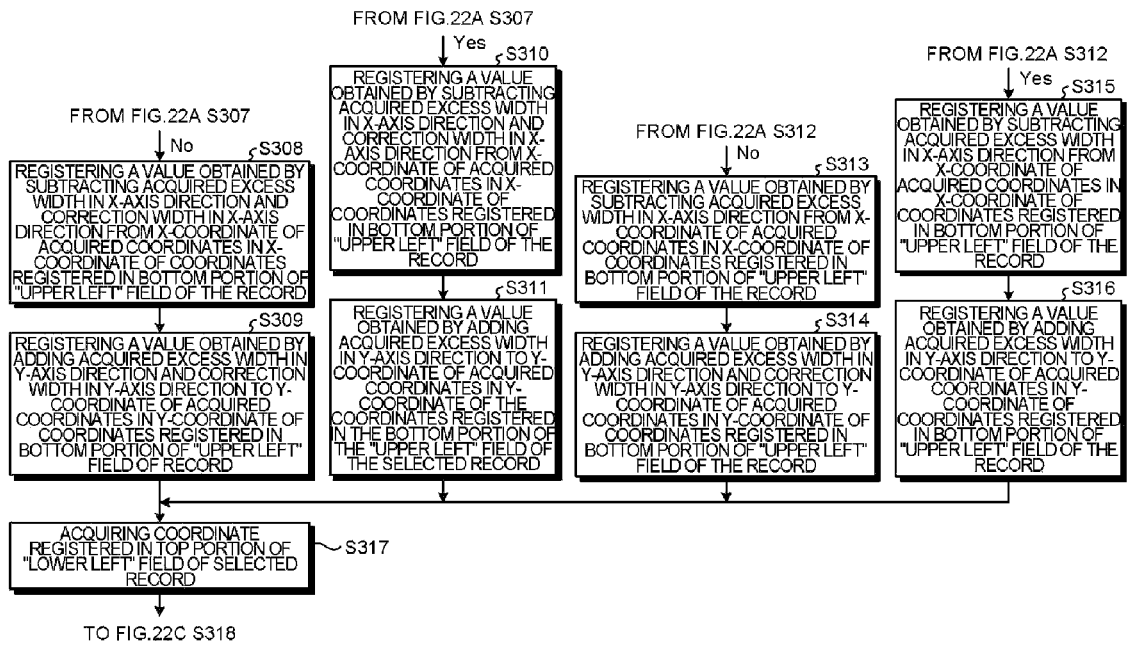
Figure 22C:
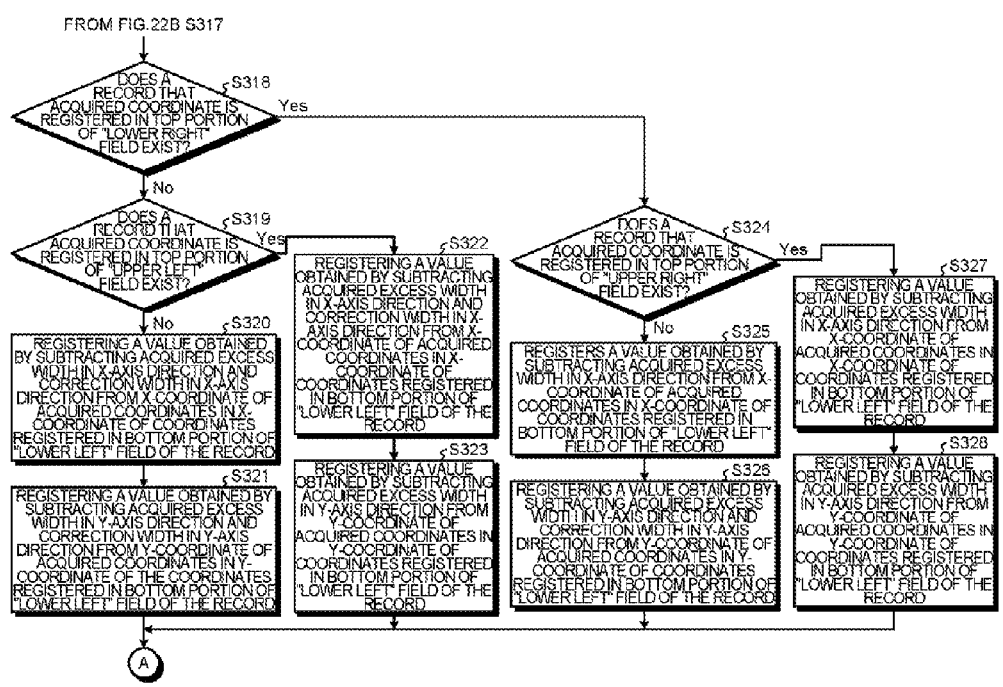
Figure 22D:
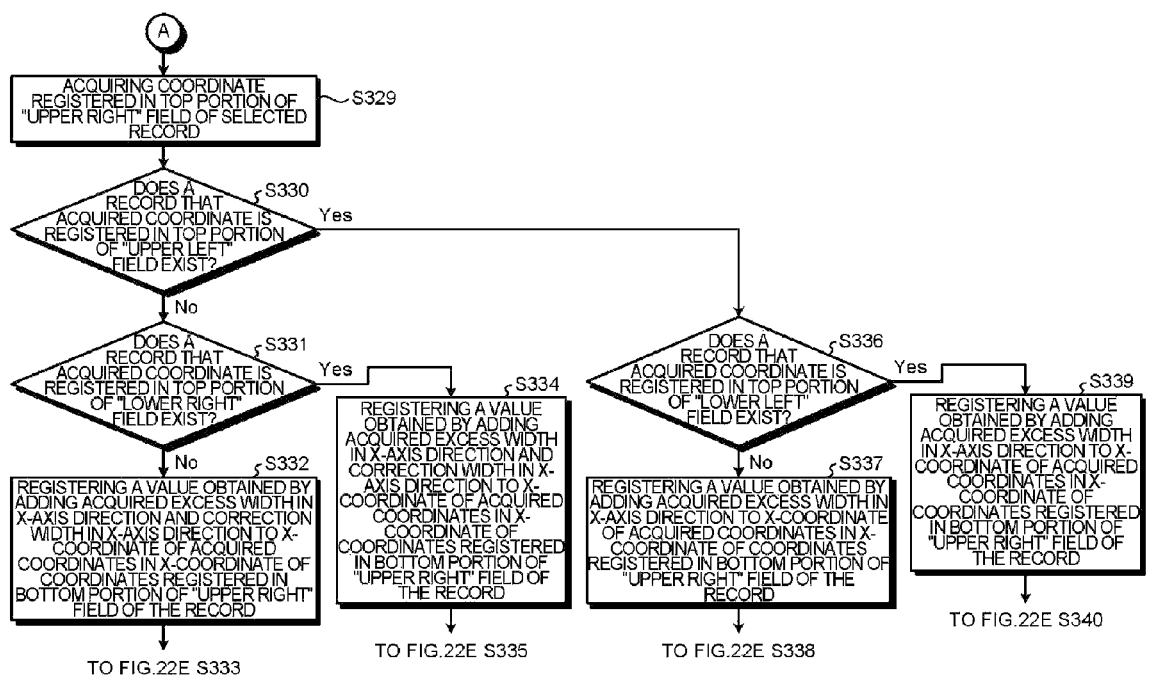
FIG. 22D, FIG. 22E and FIG. 22F are flowcharts illustrating the sequence of the predetermined frame changing process according to the embodiment.
Figure 22E:
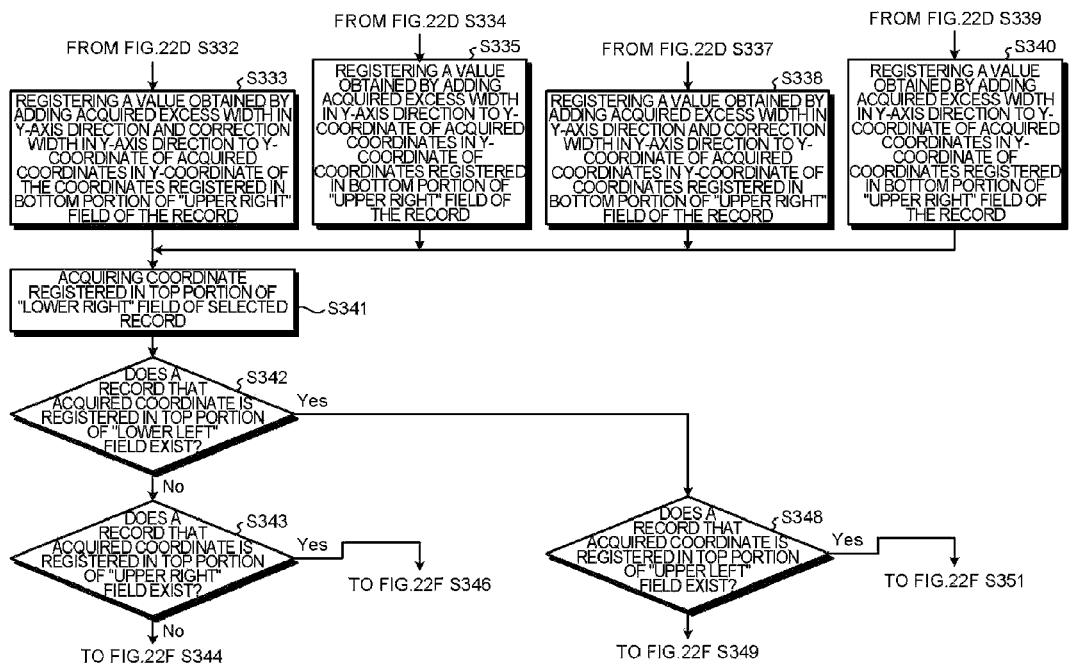
Figure 22F:
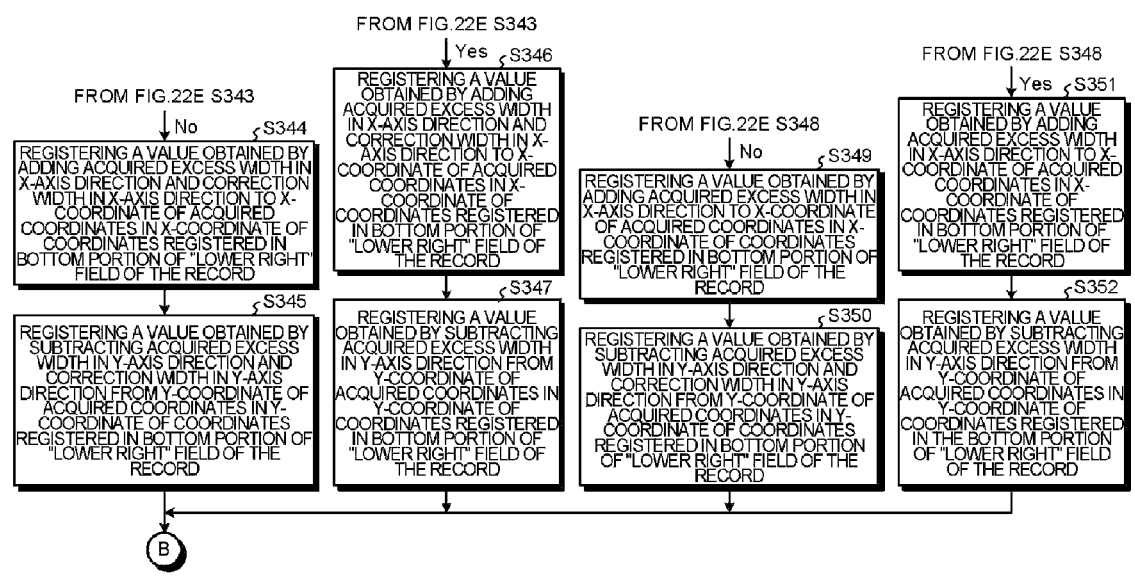

FIG. 21 is a flowchart illustrating a sequence of a predetermined frame displaying process according to the embodiment. As illustrated in FIG. 21, the setting unit 15b specifies a predetermined area among all of the areas in which the opinions are displayed first and generates the predetermined frame display screen which is a screen in which the predetermined frame determined for the specified area is displayed on the opinion. Also, the setting unit 15b controls the display unit 12 to display the generated predetermined frame display screen. Further, the setting unit 15b controls the projector 4b to display the generated predetermined frame display screen on the electronic blackboard 4a (S201).

Also, the setting unit 15b determines whether the teacher depresses the button 23a through the input unit 11, which is the touch panel, using the touch pen to determine whether an instruction to display the excess area setting screen is received. Here, the setting unit 15b may determine whether the teacher manipulates the electronic pen to depress the button 23a on the opinion displayed on the electronic blackboard 4a to determine whether the instruction to display the excess area setting screen is received (S202). When it is determined that the instruction to display the excess area setting screen is not received ("NO" at step S202), the setting unit 15b goes to step S209 to be described below.

In the meantime, when it is determined that the instruction to display the excess area setting screen is received ("YES" at step S202), the setting unit 15b controls the display unit 12 to display the excess area setting screen (S203). Also, the setting unit 15b determines whether the teacher depresses the button 26a through the input unit 11, which is the touch panel, using the touch pen to determine whether an instruction to newly set the excess width is received (S204). When it is determined that the instruction to newly set the excess width is not received ("NO" at step S204), the setting unit 15b performs the following process. That is, the setting unit 15b determines whether the button 26b is depressed through the input unit 11, which is the touch panel, by the teacher using the touch pen to determine whether an instruction to close the excess area setting screen 31 is received (S205). When it is determined that the instruction to close the excess area setting screen 31 is not received ("NO" at step S205), the setting unit 15b goes back to step S204. When it is determined that the instruction to close the excess area setting screen 31 is received ("YES" at step S205), the setting unit 15b closes the excess area setting screen 31 and control the display unit 12 to display the predetermined frame display screen (S206), and goes back to step S202.

In the meantime, when it is determined that instruction to newly set the excess width is received ("YES" at step S204), the setting unit 15b executes a predetermined frame changing process (S207).

FIG. 22A, FIG. 22B, FIG. 22C, FIG. 22D, FIG. 22E and FIG. 22F are flowcharts illustrating a sequence of the predetermined frame changing process according to the embodiment. As illustrated in FIG. 22A, FIG. 22B, FIG. 22C, FIG. 22D, FIG. 22E and FIG. 22F, the setting unit 15b acquires the excess width in the X-axis direction displayed in the area 24c, and registers the acquired excess width in the X-axis direction in the "excess width" field in the X-axis direction of the predetermined frame determining TBL 14e. Further, the setting unit 15b acquires the excess width in the Y-axis direction displayed in the area 25c, and registers the acquired excess width in the Y-axis direction in the "excess width" field in the Y-axis direction of the predetermined frame determining TBL 14e (S301).

Also, the setting unit 15b acquires the excess width and the correction width registered in each of the "excess width" field and the "correction width" field in the X-axis direction and Y-axis direction of the updated predetermined frame determining TBL 14e (S302).

Subsequently, the setting unit 15b determines whether an unselected record exists among all of the records of the table 14c_1 in which the ID of assignment received by the reception unit 15a is registered in the "assignment ID" field (S303).

When it is determined that the unselected record exists ("YES" at step S303), the setting unit 15b selects a single unselected record (S304). Also, the setting unit 15*b* acquires a coordinate registered in the top portion of the "upper left" field of the selected record (S305). Subsequently, the setting unit 15*b* determines whether a record that the acquired coordinate is registered in the top portion of the "upper right" field exists among all of the records of the table 14*c*_1 in which the ID of assignment received by the reception unit 15*a* is registered in the "assignment ID" field (S306).

When it is determined that the record that the acquired coordinate is registered in the top portion of the "upper right" field does not exist ("NO" at step S306), the setting unit 15*b* determines whether a record that the acquired coordinate is registered in the top portion of the "lower left" field exists among all of the records of the table 14*c*_1 (S307). When it is determined that the record that the acquired coordinate is registered in the top portion of the "lower left" field does not exist ("NO" at step S307), the setting unit 15*b* registers a value, which is obtained by subtracting the acquired excess width in the X-axis direction and the correction width in the X-axis direction from X-coordinate of the acquired coordinates, in X-coordinate of the coordinates registered in the bottom portion of the "upper left" field of the selected record, and updates the X-coordinate (S308). Additionally, the setting unit 15*b* registers a value, which is obtained by adding the acquired excess width in the Y-axis direction and the correction width in the Y-axis direction to Y-coordinate of the acquired coordinates, in Y-coordinate of the coordinates registered in the bottom portion of the "upper left" field of the selected record and updates the Y-coordinate (S309).

In the meantime, when it is determined that the record that the acquired coordinate is registered in the top portion of the "lower left" field exists ("YES" at step S307), the setting unit 15*b* performs the following process. That is, the setting unit 15*b* registers a value, which is obtained by subtracting the acquired excess width in the X-axis direction and the correction width in the X-axis direction from X-coordinate of the acquired coordinates, in X-coordinate of the coordinates registered in the bottom portion of the "upper left" field of the selected record and updates the X-coordinate (S310). Additionally, the setting unit 15*b* registers a value, which is obtained by adding the acquired excess width in the Y-axis direction to Y-coordinate of the acquired coordinates, in Y-coordinate of the coordinates registered in the bottom portion of the "upper left" field of the selected record, and updates the Y-coordinate (S311).

Further, when it is determined that the record that the acquired coordinate is registered in the top portion of the "upper right" field exists ("YES" at step S306), the setting unit 15*b* determines whether a record that the acquired coordinate is registered in the top portion of the "lower right" field exists among all of the records of the table 14*c*_1 (S312).

When it is determined that the record that the acquired coordinate is registered in the top portion of the "lower right" field does not exist ("NO" at step S312), the setting unit 15*b* performs the following process. That is, the setting unit 15*b* registers a value, which is obtained by subtracting the acquired excess width in the X-axis direction from X-coordinate of the acquired coordinates, in X-coordinate of the coordinates registered in the bottom portion of the "upper left" field of the selected record and updates the X-coordinate (S313). Additionally, the setting unit 15*b* registers a value, which is obtained by adding the acquired excess width in the Y-axis direction and the correction width in the Y-axis direction to Y-coordinate of the acquired coordinates, in Y-coordinate of the coordinates registered in the bottom portion of the "upper left" field of the selected record, and updates the Y-coordinate (S314).

In the meantime, when it is determined that the record that the acquired coordinate is registered in the top portion of the "lower right" field exists ("YES" at step S312), the setting unit 15*b* performs the following process. That is, the setting unit 15*b* registers a value, which is obtained by subtracting the acquired excess width in the X-axis direction from X-coordinate of the acquired coordinates, in X-coordinate of the coordinates registered in the bottom portion of the "upper left" field of the selected record, and updates the X-coordinate (S315). Additionally, the setting unit 15*b* registers a value, which is obtained by adding the acquired excess width in the Y-axis direction to Y-coordinate of the acquired coordinates, in Y-coordinate of the coordinates registered in the bottom portion of the "upper left" field of the selected record and updates the Y-coordinate (S316).

Subsequently, the setting unit 15*b* acquires a coordinate registered in the top portion of the "lower left" field of the selected record (S317). Also, the setting unit 15*b* determines whether a record that the acquired coordinate is registered in the top portion of the "lower right" field exists among all of the records of the table 14*c*_1 in which the ID of assignment received by the reception unit 15*a* is registered in the "assignment ID" field (S318).

When it is determined that the record that the acquired coordinate is registered in the top portion of the "lower right" field does not exist ("NO" at step S318), the setting unit 15*b* determines whether a record that the acquired coordinate is registered in the top portion of the "upper left" field exists among all of the records of the table 14*c*_1 (S319). When it is determined that the record that the acquired coordinate is registered in the top portion of the "upper left" field does not exist ("NO" at step S319), the setting unit 15*b* performs the following process. That is, the setting unit 15*b* registers a value, which is obtained by subtracting the acquired excess width in the X-axis direction and the correction width in the X-axis direction from X-coordinate of the acquired coordinates, in X-coordinate of the coordinates registered in the bottom portion of the "lower left" field of the selected record and updates the X-coordinate (S320). Additionally, the setting unit 15*b* registers a value, which is obtained by subtracting the acquired excess width in the Y-axis direction and the correction width in the Y-axis direction from Y-coordinate of the acquired coordinates, in Y-coordinate of the coordinates registered in the bottom portion of the "lower left" field of the selected record, and updates the Y-coordinate (S321).

In the meantime, when it is determined that the record that the acquired coordinate is registered in the top portion of the "upper left" field exists ("YES" at step S319), the setting unit 15*b* registers a value, which is obtained by subtracting the acquired excess width in the X-axis direction and the correction width in the X-axis direction from X-coordinate of the acquired coordinates, in X-coordinate of the coordinates registered in the bottom portion of the "lower left" field of the selected record and updates the X-coordinate (S322). Additionally, the setting unit 15*b* registers a value, which is obtained by subtracting the acquired excess width in the Y-axis direction from Y-coordinate of the acquired coordinates, in Y-coordinate of the coordinates registered in the bottom portion of the "lower left" field of the selected record and updates the Y-coordinate (S323).

Further, when it is determined that the record that the acquired coordinate is registered in the top portion of the "lower right" field exists ("YES" at step S318), the setting unit 15*b* determines whether a record that the acquired coordinate is registered in the top portion of the "upper right" field exists among all of the records of the table 14c_1 (S324).

When it is determined that the record that the acquired coordinate is registered in the top portion of the "upper right" field does not exist ("NO" at step S324), the setting unit 15b registers a value, which is obtained by subtracting the acquired excess width in the X-axis direction from X-coordinate of the acquired coordinates, in X-coordinate of the coordinates registered in the bottom portion of the "lower left" field of the selected record, and updates the X-coordinate (S325). Additionally, the setting unit 15b registers a value, which is obtained by subtracting the acquired excess width in the Y-axis direction and the correction width in the Y-axis direction from Y-coordinate of the acquired coordinates, in Y-coordinate of the coordinates registered in the bottom portion of the "lower left" field of the selected record and updates the Y-coordinate (S326).

In the meantime, when it is determined that the record that the acquired coordinate is registered in the top portion of the "upper right" field exists ("YES" at step S324), the setting unit 15b performs the following process. That is, the setting unit 15b registers a value, which is obtained by subtracting the acquired excess width in the X-axis direction from X-coordinate of the acquired coordinates, in X-coordinate of the coordinates registered in the bottom portion of the "lower left" field of the selected record, and updates the X-coordinate (S327). Additionally, the setting unit 15b registers a value, which is obtained by subtracting the acquired excess width in the Y-axis direction from Y-coordinate of the acquired coordinates, in Y-coordinate of the coordinates registered in the bottom portion of the "lower left" field of the selected record and updates the Y-coordinate (S328).

Subsequently, the setting unit 15b acquires a coordinate registered in the top portion of the "upper right" field of the selected record (S329). Also, the setting unit 15b determines whether a record that the acquired coordinate is registered in the top portion of the "upper left" field exists among all of the records of the table 14c_1 in which the ID of assignment received by the reception unit 15a is registered in the "assignment ID" field (S330).

When it is determined that the record that the acquired coordinate is registered in the top portion of the "upper left" field does not exist ("NO" at step S330), the setting unit 15b determines whether a record that the acquired coordinate is registered in the top portion of the "lower right" field exists among all of the records of the table 14c_1 (S331). When it is determined that the record that the acquired coordinate is registered in the top portion of the "lower right" field does not exist ("NO" at step S331), the setting unit 15b registers a value, which is obtained by adding the acquired excess width in the X-axis direction and the correction width in the X-axis direction to X-coordinate of the acquired coordinates, in X-coordinate of the coordinates registered in the bottom portion of the "upper right" field of the selected record, and updates the X-coordinate (S332). Additionally, the setting unit 15b registers a value, which is obtained by adding the acquired excess width in the Y-axis direction and the correction width in the Y-axis direction to Y-coordinate of the acquired coordinates, in Y-coordinate of the coordinates registered in the bottom portion of the "upper right" field of the selected record, and updates the Y-coordinate (S333).

In the meantime, when it is determined that the record that the acquired coordinate is registered in the top portion of the "lower right" field exists ("YES" at step S331), the setting unit 15b registers a value, which is obtained by adding the acquired excess width in the X-axis direction and the correction width in the X-axis direction to X-coordinate of the acquired coordinates, in X-coordinate of the coordinates registered in the bottom portion of the "upper right" field of the selected record, and updates the X-coordinate (S334). Additionally, the setting unit 15b registers a value, which is obtained by adding the acquired excess width in the Y-axis direction to Y-coordinate of the acquired coordinates, in Y-coordinate of the coordinates registered in the bottom portion of the "upper right" field of the selected record and updates the Y-coordinate (S335).

Further, when it is determined that the record that the acquired coordinate is registered in the top portion of the "upper left" field exists ("YES" at step S330), the setting unit 15b determines whether a record that the acquired coordinate is registered in the top portion of the "lower left" field exists among all of the records of the table 14c_1 (S336).

When it is determined that the record that the acquired coordinate is registered in the top portion of the "lower left" field does not exist ("NO" at step S336), the setting unit 15b performs the following process. That is, the setting unit 15b registers a value, which is obtained by adding the acquired excess width in the X-axis direction to X-coordinate of the acquired coordinates, in X-coordinate of the coordinates registered in the bottom portion of the "upper right" field of the selected record, and updates the X-coordinate (S337). Additionally, the setting unit 15b registers a value, which is obtained by adding the acquired excess width in the Y-axis direction and the correction width in the Y-axis direction to Y-coordinate of the acquired coordinates, in Y-coordinate of the coordinates registered in the bottom portion of the "upper right" field of the selected record, and updates the Y-coordinate (S338).

In the meantime, when it is determined that the record that the acquired coordinate is registered in the top portion of the "lower left" field exists ("YES" at step S336), the setting unit 15b performs the following process. That is, the setting unit 15b registers a value, which is obtained by adding the acquired excess width in the X-axis direction to X-coordinate of the acquired coordinates, in X-coordinate of the coordinates registered in the bottom portion of the "upper right" field of the selected record, and updates the X-coordinate (S339). Additionally, the setting unit 15b registers a value, which is obtained by adding the acquired excess width in the Y-axis direction to Y-coordinate of the acquired coordinates, in Y-coordinate of the coordinates registered in the bottom portion of the "upper right" field of the selected record, and updates the Y-coordinate (S340).

Subsequently, the setting unit 15b acquires a coordinate registered in the top portion of the "lower right" field of the selected record (S341). Also, the setting unit 15b determines whether a record that the acquired coordinate is registered in the top portion of the "lower left" field exists among all of the records of the table 14c_1 in which the ID of assignment received by the reception unit 15a is registered in the "assignment ID" field (S342).

When it is determined that the record that the acquired coordinate is registered in the top portion of the "lower left" field does not exist ("NO" at step S342), the setting unit 15b determines whether a record that the acquired coordinate is registered in the top portion of the "upper right" field exists among all of the records of the table 14c_1 (S343). When it is determined that the record that the acquired coordinate is registered in the top portion of the "upper right" field does not exist ("NO" at step S343), the setting unit 15b registers a value, which is obtained by adding the acquired excess width in the X-axis direction and the correction width in the X-axis direction to X-coordinate of the acquired coordinates, in X-coordinate of the coordinates registered in the bottom portion of the "lower right" field of the selected record, and updates the X-coordinate (S344). Additionally, the setting unit 15b registers a value, which is obtained by subtracting the acquired excess width in the Y-axis direction and the correction width in the Y-axis direction from Y-coordinate of the acquired coordinates, in Y-coordinate of the coordinates registered in the bottom portion of the "lower right" field of the selected record, and updates the Y-coordinate (S345).

In the meantime, when it is determined that the record that the acquired coordinate is registered in the top portion of the "upper right" field exists ("YES" at step S343), the setting unit 15b registers a value, which is obtained by adding the acquired excess width in the X-axis direction and the correction width in the X-axis direction to X-coordinate of the acquired coordinates, in X-coordinate of the coordinates registered in the bottom portion of the "lower right" field of the selected record, and updates the X-coordinate (S346). Additionally, the setting unit 15b registers a value, which is obtained by subtracting the acquired excess width in the Y-axis direction from Y-coordinate of the acquired coordinates, in Y-coordinate of the coordinates registered in the bottom portion of the "lower right" field of the selected record, and updates the Y-coordinate (S347).

Further, when it is determined that the record that the acquired coordinate is registered in the top portion of the "lower left" field exists ("YES" at step S342), the setting unit 15b determines whether a record that the acquired coordinate is registered in the top portion of the "upper left" field exists among all of the records of the table 14c_1 (S348).

When it is determined that the record that the acquired coordinate is registered in the top portion of the "upper left" field does not exist ("NO" at step S348), the setting unit 15b registers a value, which is obtained by adding the acquired excess width in the X-axis direction to X-coordinate of the acquired coordinates, in X-coordinate of the coordinates registered in the bottom portion of the "lower right" field of the selected record, and updates the X-coordinate (S349). Additionally, the setting unit 15b registers a value, which is obtained by subtracting the acquired excess width in the Y-axis direction and the correction width in the Y-axis direction from Y-coordinate of the acquired coordinates, in Y-coordinate of the coordinates registered in the bottom portion of the "lower right" field of the selected record, and updates the Y-coordinate (S350).

In the meantime, when it is determined that the record that the acquired coordinate is registered in the top portion of the "lower right" field exists ("YES" at step S348), the setting unit 15b performs the following process. That is, the setting unit 15b registers a value, which is obtained by adding the acquired excess width in the X-axis direction to X-coordinate of the acquired coordinates, in X-coordinate of the coordinates registered in the bottom portion of the "lower right" field of the selected record, and updates the X-coordinate (S351). Additionally, the setting unit 15b registers a value, which is obtained by subtracting the acquired excess width in the Y-axis direction from Y-coordinate of the acquired coordinates, in Y-coordinate of the coordinates registered in the bottom portion of the "lower right" field of the selected record, and updates the Y-coordinate (S352). Also, the setting unit 15b goes back to step S303. Here, when it is determined that the unselected record does not exist ("NO" at step S303), the setting unit 15b stores the process results in the internal memory of the control unit 15 and returns its control.

Referring back to the description of FIG. 21, the setting unit 15b specifies a predetermined area among all of the areas in which the opinions areas displayed first and generates the predetermined frame display screen which is a screen in which the predetermined frame determined for the specified area is disposed on the opinion in a range which is set in the predetermined frame changing process. Further, the setting unit 15b generates the predetermined frame display screen such as a screen in which a predetermined frame is displayed in a broken line. Also, the setting unit 15b controls the display unit 12 to display the generated predetermined frame display screen. Further, the setting unit 15b controls the projector 4b to display the generated predetermined frame display screen on the electronic blackboard 4a (S208).

Also, the setting unit 15b determines whether the button 23b is depressed through the input unit 11, which is the touch panel, by the teacher using the touch pen to determine whether an instruction to close the predetermined frame display screen is received (S209). When it is determined that the instruction to close the predetermined frame display screen is not received ("NO" at step S209), the setting unit 15b goes back to step S202.

In the meantime, when it is determined that the instruction to close the predetermined frame display screen is received ("YES" at step S209), the setting unit 15b controls the display unit 12 to close the predetermined frame display screen and display the previous screen in which the predetermined frame display screen was not displayed. Further, the setting unit 15b controls the projector 4b to close the predetermined frame display screen and display the previous screen in which the predetermined frame display screen was not displayed on the electronic blackboard 4a (S210). Also, the setting unit 15b stores the process result in the internal memory and returns its control.

Figure 20:
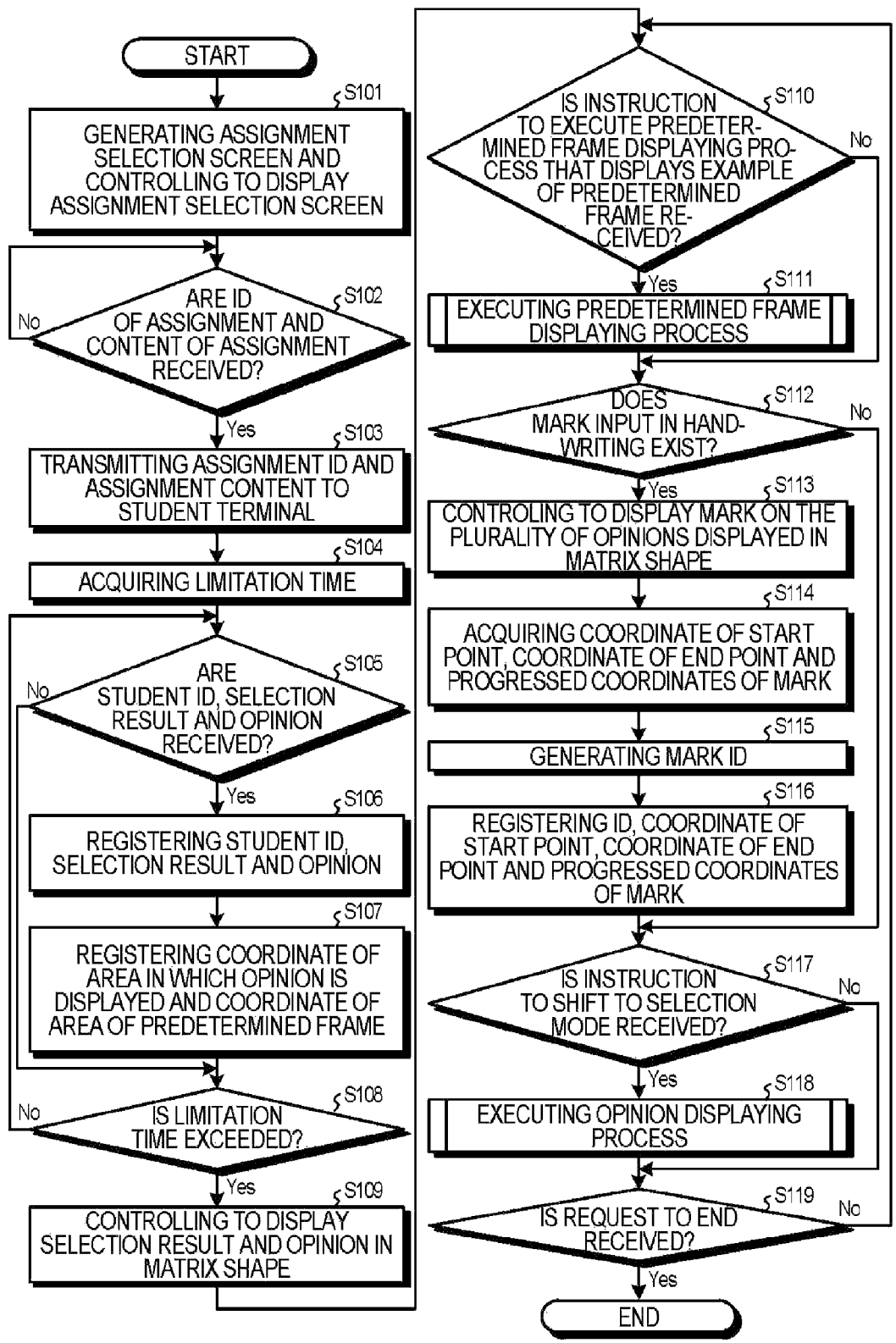
FIG. 20 is a flowchart illustrating a sequence of a display control process according to the embodiment.

Referring back to the description of FIG. 20, the reception unit 15a determines whether a mark input in handwriting due to the manipulation of the touch pen by the teacher exists based on the input result from the input unit 11 which is the touch panel provided on the display unit 12. Further, the reception unit 15a may determine whether a mark input in handwriting due to the manipulation of the electronic pen by the teacher exists on the opinions displayed on the electronic blackboard 4a (S112).

When it is determined that the mark input in handwriting does not exist ("NO" at step S112), the reception unit 15a goes to step S117 to be described below. In the meantime, when it is determined that the mark input in handwriting exists ("YES" at step S112), the reception unit 15a controls the display unit 12 to display the mark input in handwriting on the opinions displayed in a matrix shape. Further, the reception unit 15a controls the projector 4b to display the mark input in handwriting on the opinions displayed on the electronic blackboard 4a in a matrix shape. (S113).

Also, the reception unit 15a acquires the coordinate of the start point and the coordinate of the end point of the mark input in handwriting every one stroke. Further, the reception unit 15a acquires the progressed coordinates that are the coordinates of points between the start point and the end point of the mark along the mark at regular intervals (S114). Further, the reception unit 15a generates an ID of a new mark not registered in the handwriting-input mark coordinate DB 14d (S115).

Also, the reception unit 15a adds the new record in the handwriting-input mark coordinate DB 14d and registers the generated ID of the mark in the "mark ID" field of the added record. The reception unit 15a registers the coordinate of the start point of the mark input in handwriting in the "start point coordinate" field of the added record. Further, the reception unit 15a registers the coordinate of the end point of the mark input in handwriting in the "end point coordinate" field of the added record. The reception unit 15a registers the progressed coordinates of the mark input in handwriting in the "progressed coordinate" field of the added record (S116).

Also, the reception unit 15a determines whether the teacher depresses the button 21a through the input unit 11, which is the touch panel, using the touch pen to determine whether an instruction to shift to a selection mode for selecting an opinion intended to be displayed in an enlarged scale is received. Here, the reception unit 15a may determine whether the teacher manipulates the electronic pen to depress the button 21a on the opinion displayed on the electronic blackboard 4a to determine whether the instruction to shift to the selection mode is received (S117). When it is determined that the instruction to shift to the selection mode is not received ("NO" at step S117), the reception unit 15a goes to step S119 to be described. In the meantime, when it is determined that the instruction to shift to the selection mode is received ("YES" at step S117), the changing unit 15c shifts to the selection mode to execute the opinion displaying process (S118).

Figure 23:
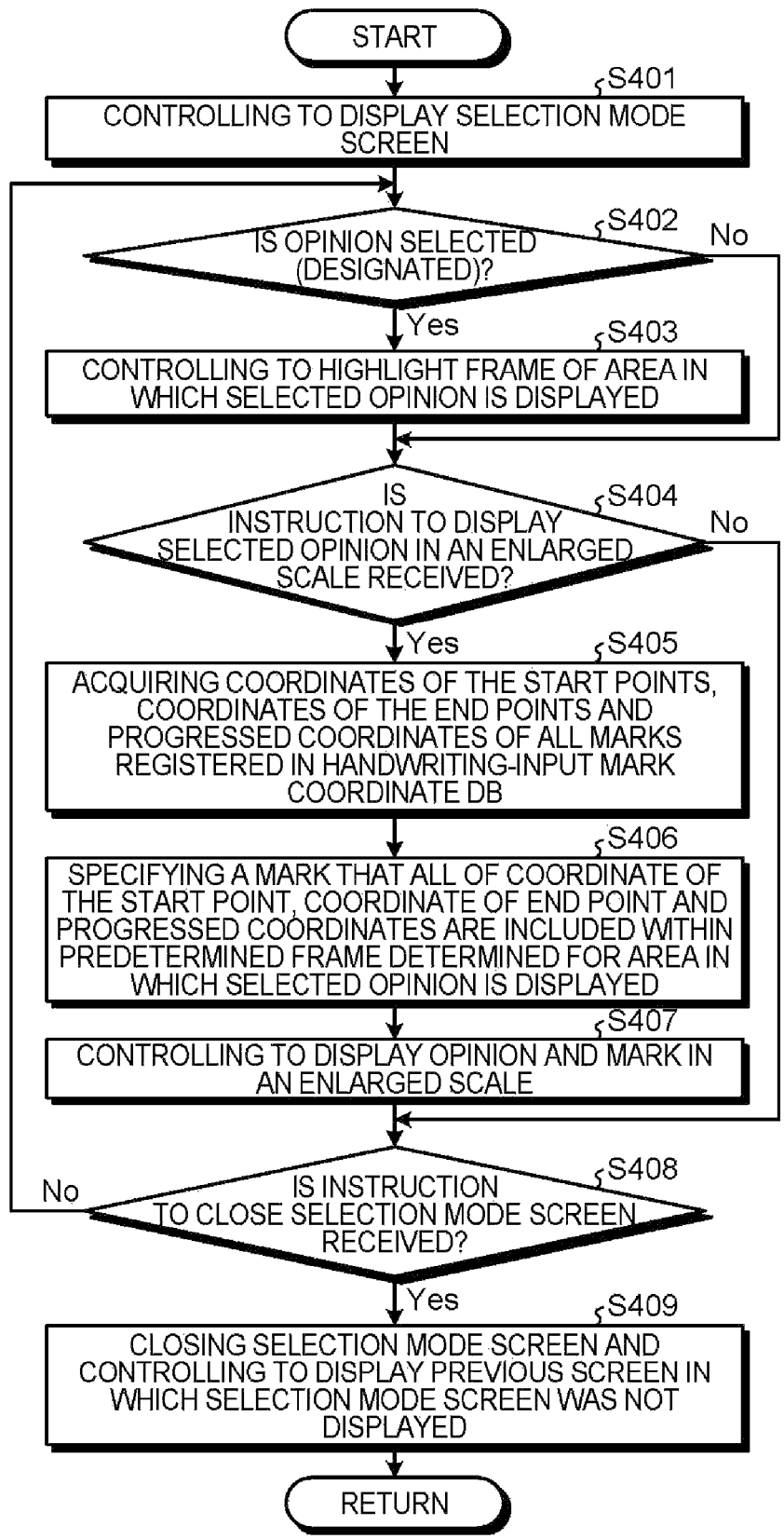
FIG. 23 is a flowchart illustrating a sequence of an opinion displaying process according to the embodiment.

FIG. 23 is a flowchart illustrating a sequence of an opinion displaying process according to the embodiment. As illustrated in an example of FIG. 23, the changing unit 15c generates the selection mode screen first and controls the display unit 12 to display the selection mode screen. Further, the changing unit 15c controls the projector 4b to display the generated selection mode screen on the electronic blackboard 4a (S401).

Also, the changing unit 15c determines whether the opinion intended to be displayed in an enlarged scale is selected due to the manipulation of the input unit 11, which is the touch panel, by the teacher using the touch pen (S402). When it is determined that the opinion intended to be displayed in an enlarged scale is not selected by the teacher ("NO" at step S402), the changing unit 15c goes to S404. In the meantime, when it is determined that the opinion intended to be displayed in an enlarged scale is selected by the teacher ("YES" at step S402), the changing unit 15c controls the display unit 12 to highlight the frame of the area in which the selected opinion is displayed. Further, the changing unit 15c controls the projector 4b to highlight the frame of the area in which the selected opinion is displayed on the electronic blackboard 4a (S403).

Also, the changing unit 15c determines whether the teacher depresses the button 27a through the input unit 11, which is the touch panel, using the touch pen to determine whether an instruction to display the selected opinion in an enlarged scale is received. Here, the reception unit 15a may determine whether the teacher manipulates the electronic pen to depress the button 27a on the opinion displayed on the electronic blackboard 4a to determine whether the instruction to display the selected opinion in an enlarged scale is received (S404).

When it is determined that the instruction to display the selected opinion in an enlarged scale is not received ("NO" at step S404), the changing unit 15c goes to step S408. In the meantime, when it is determined that the instruction to display the selected opinion in an enlarged scale is received ("YES" at step S404), the changing unit 15c acquires the coordinates of the start points, the coordinates of the end points and the progressed coordinates of all the marks registered in the handwriting-input mark coordinate DB 14d (S405).

Also, the changing unit 15c specifies a mark that all of the coordinate of the start point, the coordinate of the end point and the progressed coordinates are included within the predetermined frame determined for the area in which the selected opinion is displayed, among all the marks (S406).

Also, the changing unit 15c controls the display unit 12 to display the selected opinion and the specified mark in an enlarged scale. Further, the changing unit 15c controls the projector 4b to display the selected opinion and the specified mark on the electronic blackboard 4a in an enlarged scale. Further, the changing unit 15c may transmit the instruction to display the selected opinion and the specified mark to the student terminal 3 (S407).

Also, the changing unit 15c determines whether the button 27b is depressed through the input unit 11, which is the touch panel, by the teacher using the touch pen to determine whether an instruction to close the selection mode screen is received. Here, changing unit 15c may determine whether the teacher manipulates the electronic pen to depress the button 27b on the opinion displayed on the electronic blackboard 4a to determine whether the instruction to close the selection mode screen is received (S408). When it is determined that the instruction to close the selection mode screen is not received ("NO" at step S408), the changing unit 15c goes back to step S402.

In the meantime, when it is determined that the instruction to close the selection mode screen is received ("YES" at step S408), the changing unit 15c closes the selection mode screen. Also, the changing unit 15c controls the display unit 12 to generate and display a previous screen in which the selection mode screen was not displayed using the contents registered in the assignment reply DB 14c and the contents registered in the handwriting-input mark coordinate DB 14d. Further, the changing unit 15c controls the projector 4b to display the generated screen on the electronic blackboard 4a. Further, the changing unit 15c may transmit the instruction to display the generated screen to the student terminal 3 (S409). Also, the changing unit 15c stores the process results in the internal memory and returns its control.

Referring back to the description of FIG. 20, the reception unit 15a determines whether a request to end is input from the input unit 11 due to the manipulation of the input unit 11, which is the touch panel, by the teacher using the touch pen (S119). When it is determined that the request to end is not input from the input unit 11 ("NO" at step S119), the reception unit 15a goes back to step S110. In the meantime, when it is determined that the request to end is input ("YES" at step S119), the reception unit 15a ends the display control process.

As described above, the teacher terminal 2 according to the embodiment receives designation of an opinion intended to be displayed in an enlarged scale among a plurality of opinions displayed on the display unit 12 and the electronic blackboard 4a in a matrix shape. When an opinion intended to be displayed in an enlarged scale is designated, the teacher terminal 2 changes the degree of emphasis in the mark displayed on the display unit 12 or the electronic blackboard 4a depending on a positional relationship between the mark and the area in which the designated position is displayed. Therefore, in the teacher terminal 2, when the opinion is displayed in an enlarged scale, the degree of emphasis in a mark that has a low relevancy to such an opinion is made lower than a mark that has a high relevancy to the opinion.

Accordingly, the opinion display in an enlarged scale is allowed to be easily viewed in the teacher terminal 2.

Further, the teacher terminal 2 changes the degree of emphasis in a mark so as to make lower the degree of emphasis in the mark that at least a portion of the mark is not included within the predetermined frame area determined for an area in which the designated opinion is displayed than that of a mark included within the predetermined frame area in its entirety.

Further, in the teacher terminal 2, the range of the predetermined frame determined for the area in which the opinion is displayed is a range according to a position of an area of the predetermined frame in a display area. That is, in the teacher terminal 2, the range of the predetermined frame corresponds to a range to which a property that a position of the handwriting mark input into a certain area in the certain area is relevant to a position of the certain area in the display area is added. Accordingly, in the teacher terminal 2, the range of the predetermined frame is determined such that a portion of the mark input in handwriting is prevented from being located outside of the range of the predetermined frame in consideration of the property. Therefore, according to the teacher terminal 2, a degree of emphasis in the mark may be changed in a better accuracy at the time of displaying the opinion in an enlarged scale.

Further, the teacher terminal 2 changes the degree of emphasis in each mark such that the mark included within the predetermined frame in its entirety determined for the area in which the designated opinion is displayed is displayed in a solid line and the mark that which at least a portion is not included within the predetermined frame area is displayed in a broken line.

Further, the teacher terminal 2 changes the degree of emphasis in each mark such that a thickness of the mark that at least a portion is not included within the predetermined frame area in which the designated opinion is displayed becomes narrower than that of the mark included within the predetermined frame in its entirety.

Further, the teacher terminal 2 changes the degree of emphasis in each mark such that a line density of the mark that at least a portion is not included within the predetermined frame area in which the designated opinion is displayed becomes thinner than that of the mark included within the predetermined frame in its entirety.

While descriptions have been made on the embodiments of the disclosed apparatus, the present disclosure may be embodied in a variety of modifications in addition to the embodiments described above.

For example, in the embodiment described above, a case where a single opinion is selected by the teacher, but the disclosed apparatus is not limited thereto. For example, the disclosed apparatus may be configured such that a plurality of opinions are selected by the teacher. FIG. 24 and FIG. 25 are views for explaining modified examples of the embodiment. The selection mode screen, which is displayed by the teacher terminal according to the modified example, illustrated in the example of FIG. 24 indicates a case where four opinions replied by the students "Tanaka", "Yamada", "Honda" and "Kuroda" are selected by the teacher. The button 27c in the selection mode screen illustrated in the example of FIG. 24 is a button for releasing the selected opinion. Also, in the selection mode screen illustrated in the example of FIG. 24, when the button 27a is depressed by the teacher, the teacher terminal according to the modified example integrates respective four predetermined frame areas in which four selected opinions are displayed. Also, the teacher terminal according to the modified example specifies a mark that all of the coordinate of the start point, the coordinate of the end point and the progressed coordinates of the mark are included within the integrated area. For example, in the example of FIG. 24, the teacher terminal according to the modified example specifies the marks 22a, 22b, 22c that all of the coordinates of the start points, the coordinates of the end points and the progressed coordinates of the marks are included within the integrated area. Also, the teacher terminal according to the modified example displays the marks 22a, 22b, 22c in an enlarged scale together with four selected opinions, as illustrated in the example of FIG. 25.

Further, all or some of processes described as performed automatically among the respective processes described in each embodiment may be performed manually. Further, all or some of processes described as being performed manually among the respective processes described in each embodiment may be performed automatically by a well-known method.

Further, it is possible to arbitrarily divide processing in each step of each process described in each embodiment into sub-processing or integrate the processing depending on various loads or use situations. Further, one or more of the steps may be omitted.

Further, a processing sequence in each step of each process described in each embodiment may be changed depending on various loads or use situations.

Further, each constituent of each device illustrated is a functional and/or conceptual component, and may not be required necessarily to have physically the same configuration as illustrated one. That is, specifics of distribution and/or integration of the devices is not limited to the illustrated specifics, and all or some of the specifics may be configured by distributing and/or integrating the devices functionally or physically at an any unit depending on various loads or use situations. For example, the reception unit 15a of the teacher terminal 2 may perform the processes of steps S401 and S402 instead of the changing unit 15c. In this case, the reception unit 15a has a function of receiving designation of a mark intended to be displayed in an enlarged scale among a plurality of marks displayed in a matrix shape.

[Display Control Program]

Figure 26:
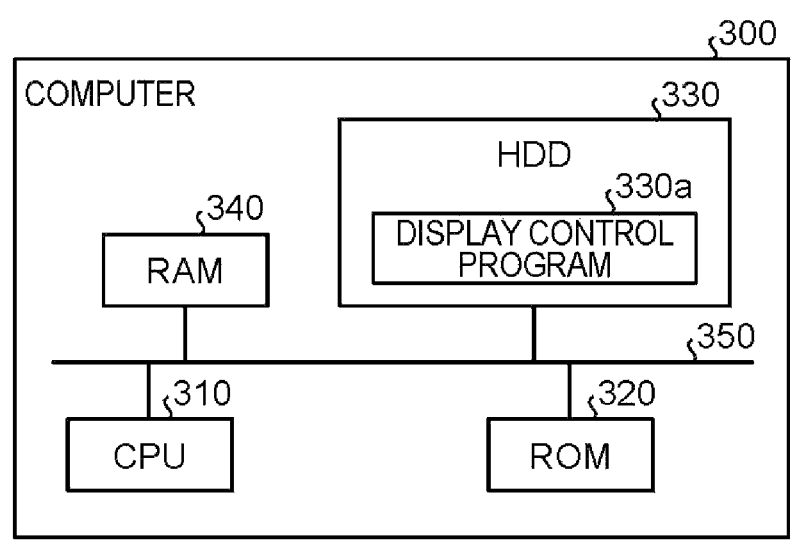
FIG. 26 is a view illustrating a computer that executes a display control program.

Further, various processes of the teacher terminal 2 described in the embodiments described above may be realized by allowing a program prepared in advance to be executed in a computer system such as a personal computer or a work station. Accordingly, in the following description, an example of a computer which executes a display process program and has the same function as the teacher terminal 2 described in the embodiment will be described with reference to FIG. 26. FIG. 26 is a view illustrating a computer that executes the display processing program.

As illustrated in FIG. 26, a computer 300 may include a CPU 310, a ROM 320, a HDD (Hard Disk Drive) 330 and a RAM 340. These equipments 310 to 340 may be connected with one another through, for example, a bus 350.

A basic program such as an Operating System (OS) may be stored in the ROM 320. Further, a display process program 330a which implements the same function as that of the reception unit 15a or the display control unit 15ba may be stored in the HDD 330 in advance. Further, various DBs and TBLs stored in the storage unit 14 may be formed in the HDD 330.

Also, the CPU 310 may read out the display process program 330a from the HDD 330 and execute the display process program 330a.

Also, the CPU 310 may read out and store various DBs and TBLs from and in the RAM 340. Further, the CPU 310 may execute the display process program 330a using various DBs and TBLs stored in the RAM 340. Further, data intended to be stored in the RAM 340 may not be stored in its entirety. Data to be used for executing the process may be stored in the RAM 340.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A display control apparatus comprising:
   a memory;
   one or more processors coupled to the memory and configured to:
   receive designation of at least one data among a plurality of data when each of the plurality of data is disposed and displayed in each of a plurality of different first areas of a display area by a display apparatus,
      change a degree of emphasis in each symbol displayed on the display area depending on a positional relationship between the symbol and the data associated with the received designation,
      change the degree of emphasis in each symbol displayed on the display area such that the degree of emphasis in each symbol included only partially within a second area, the second area being larger than the first area in which the data associated with the designation is displayed and including the first area in which the data associated with the designation is displayed, is made lower than the degree of emphasis in each symbol included entirely within the second area, and
      change the degree of emphasis in each symbol displayed on the display area such that the degree of emphasis in each symbol in which at least one of the start point, the end point and progressed points which are points between the start point and the end point are not included within the second area is made lower than the degree of emphasis in each symbol in which all of the coordinate of the start point, the coordinate of the end point and the progressed points of the symbol are included within the second area.

2. The display control apparatus according to claim 1, wherein a range of the second area is a range according to a position of the first area within the display area.

3. The display control apparatus according to claim 1, wherein the one or more processors are configured to receive designation of two or more data among the plurality of data, and
   change the degree of emphasis in each symbol displayed on the display area such that the degree of emphasis in each symbol in which a portion of the symbol is not included within an area in which each of two or more second areas that are determined based on two or more first areas in which two or more data associated with the designation are displayed are integrated is made lower than the degree of emphasis in each symbol included in the area, in which each of two or more second areas are integrated in its entirety.

4. The display control apparatus according to claim 1, wherein the one or more processors are further configured to change the degree of emphasis in each symbol such that a line of each symbol included in the second area in its entirety is displayed in a solid line and a line of each symbol in which at least a portion of the symbol is not included within the second area is displayed in a broken line.

5. The display control apparatus according to claim 1, wherein the one or more processors are further configured to change the degree of emphasis of each symbol such that a thickness of each symbol in which at least a portion of the symbol is not included in the second area becomes narrower than a thickness of each symbol included within the second area in its entirety.

6. The display control apparatus according to claim 1, wherein the one or more processors are further configured to change the degree of emphasis in each symbol such that a line density of each symbol in which at least a portion of the symbol is not included in the second area becomes thinner than a line density of each symbol included within the second area in its entirety.

7. The display control apparatus according to claim 1, wherein the symbol is any one of a character, a sign and a figure.

8. A system comprising:
   a display apparatus; and
   a terminal,
   wherein the display apparatus includes a display unit which performs displaying according to an instruction issued from the terminal,
   the terminal includes:
   a memory;
   one or more processors coupled to the memory and configured to:
   receive designation of any data among a plurality of data when transmitting a first instruction to dispose and display each of the plurality of data in a each of a plurality of different first areas of a display area to the display apparatus and cause each of the plurality of data to be disposed and displayed in the plurality of different first areas of the display area; and transmit a second instruction to change a degree of emphasis in each symbol displayed on the display area depending on a positional relationship between the symbol and the data associated with the received designation,
   wherein the display apparatus changes the degree of emphasis in each symbol displayed on the display area such that the degree of emphasis in each symbol included only partially within a second area, the second area being larger than the first area in which the data associated with the designation is displayed and including the first area in which the data associated with the designation is displayed, is made lower than the degree of emphasis in each symbol included entirely within the second area, and
   wherein the display apparatus changes the degree of emphasis in each symbol displayed on the display area such that the degree of emphasis in each symbol in which at least one of the start point, the end point and progressed points which are points between the start point and the end point are not included within the second area is made lower than the degree of emphasis in each symbol in which all of the coordinate of the start point, the coordinate of the end point and the progressed points of the symbol are included within the second area.

9. A non-transitory computer-readable storage medium storing a computer executable display control program that, when executed, causes a computer, to perform a process comprising:
  receiving designation of least one data among a plurality of data when each of a plurality of data is disposed and displayed in the plurality of different first areas of a display area by a display apparatus;
  changing a degree of emphasis in each symbol displayed on the display area depending on a positional relationship between the symbol and the data associated with the designation when the designation is received;
  changing the degree of emphasis in each symbol displayed on the display area such that the degree of emphasis in each symbol included only partially within a second area, the second area being larger than the first area in which the data associated with the designation is displayed and including the first area in which the data associated with the designation is displayed, is made lower than the degree of emphasis in each symbol included entirely within the second area; and
  changing the degree of emphasis in each symbol displayed on the display area such that the degree of emphasis in each symbol in which at least one of the start point, the end point and progressed points which are points between the start point and the end point are not included within the second area is made lower than the degree of emphasis in each symbol in which all of the coordinate of the start point, the coordinate of the end point and the progressed points of the symbol are included within the second area.

* * * * *